United States Patent
Mizuno et al.

(10) Patent No.: US 7,184,604 B2
(45) Date of Patent: Feb. 27, 2007

(54) WAVELET PROCESSING APPARATUS AND WAVELET PROCESSING METHOD

(75) Inventors: Yusuke Mizuno, Osaka (JP); Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 801 days.

(21) Appl. No.: 10/372,248

(22) Filed: Feb. 25, 2003

(65) Prior Publication Data

US 2003/0169937 A1   Sep. 11, 2003

(30) Foreign Application Priority Data

Feb. 28, 2002 (JP) ............................. 2002-053521
Sep. 5, 2002 (JP) ............................. 2002-259938

(51) Int. Cl.
*G06K 9/36* (2006.01)

(52) U.S. Cl. ...................................................... 382/248

(58) Field of Classification Search ................ 382/232, 382/236, 238–240, 243, 248; 348/395.1, 348/398.1, 403.1–405.1, 408.1, 420.1, 426.1; 375/240, 240.02, 240.11–240.12, 240.18–240.19, 375/240.21, 240.24

See application file for complete search history.

(56) References Cited

U.S. PATENT DOCUMENTS 6,546,143 B1 * 4/2003 Taubman et al. ........... 382/240
6,701,020 B2 * 3/2004 Chrysafis et al. .......... 382/239
6,956,973 B1 * 10/2005 Liang et al. ................ 382/240

* cited by examiner

*Primary Examiner*—Jose L. Couso
(74) *Attorney, Agent, or Firm*—Oblon, Spivak, McClelland, Maier & Neustadt, P.C.

(57) ABSTRACT

It is an object of the present invention to prevent an image distortion from occurring by using a line memory of small memory capacity. For example, an image is decomposed into strip regions 12, and each strip region 12 is filtered together with certain excess data 14 from a neighboring strip region 12 to prevent an image distortion from occurring at the boundary between the strip regions 12 while executing band decomposition on the strip region 12 which is smaller in size than the entire image with a smaller line memory. In the band decomposition, a line memory which supports band decomposition of, for example, 3 decomposition levels is repeatedly and recursively used, whereby band decomposition of deeper decomposition levels is executed without any problems. In this manner, line-based wavelet transform for deeper decomposition levels is executed with a small line memory. Also reverse wavelet transform is executed in the similar manner.

36 Claims, 44 Drawing Sheets

EXCESS DATA

▨ EXCESSIVELY READ OUT DATA

▧ NORMALLY READ OUT DATA

■ EXCESSIVELY READ OUT DATA

□ NORMALLY READ OUT DATA

■ EXCESSIVELY READ OUT DATA

□ NORMALLY READ OUT DATA

- EXCESSIVELY READ OUT DATA
- NORMALLY READ OUT DATA

▨ EXCESSIVELY READ OUT DATA

☐ NORMALLY READ OUT DATA

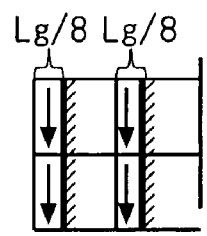
F I G . 5 0 A
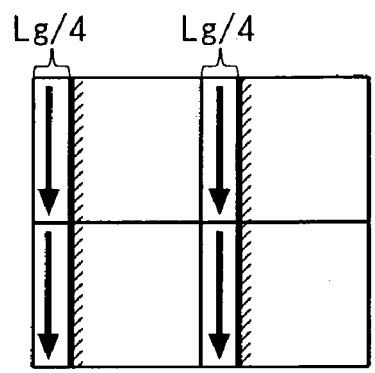
F I G . 5 0 B
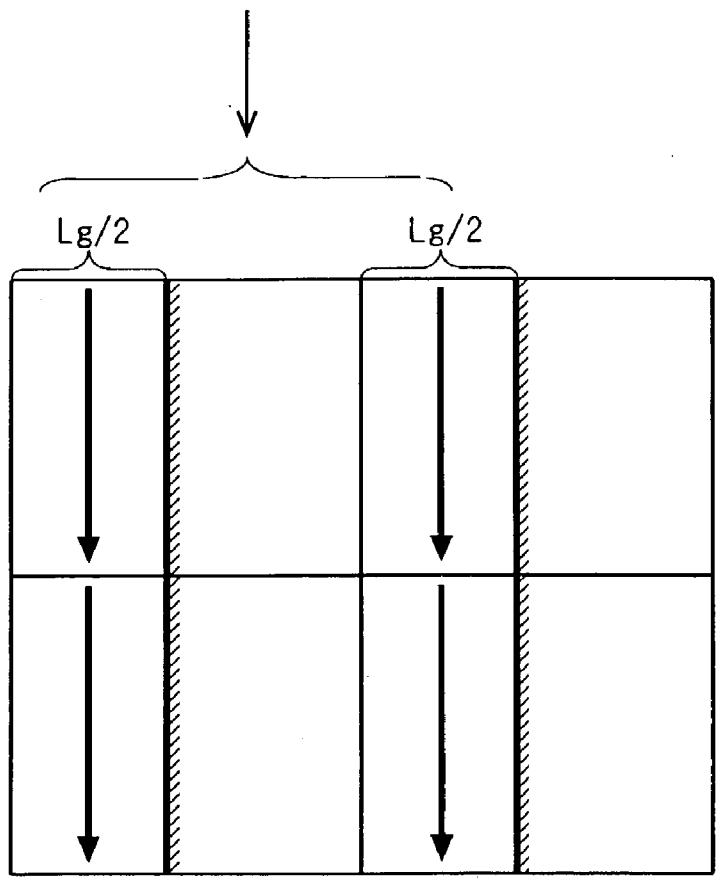
F I G . 5 0 C

■ DATA TO BE EXCESSIVELY SYNTHESIZED
  OR DATA NOT SYNTHESIZED

▨ DATA TO BE EXCESSIVELY READ OUT
  OR DATA TO BE REUSED

□ NORMALLY READ OUT DATA

▨ DATA TO BE EXCESSIVELY READ OUT
  OR DATA TO BE REUSED

□ NORMALLY READ OUT DATA

F I G. 7 2
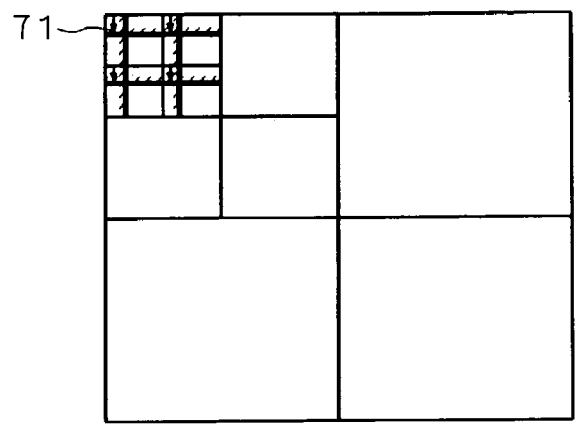
F I G. 7 3
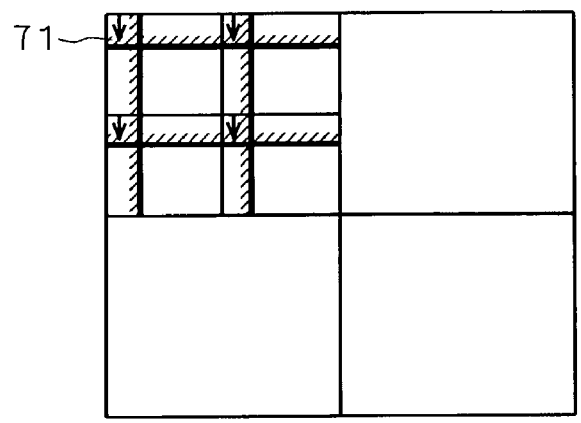
F I G. 7 4
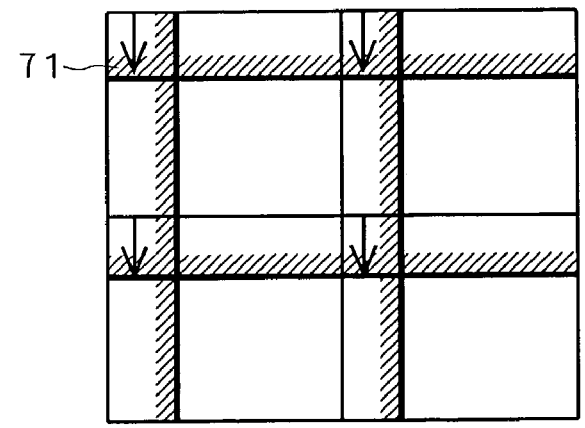

WAVELET PROCESSING APPARATUS AND WAVELET PROCESSING METHOD

BACKGROUND OF THE INVENTION

1. Field of the Invention

The present invention relates to a wavelet processing apparatus and a related technique thereto.

2. Description of the Background Art

In JPEG2000 format, as shown in FIG. 57, an original image is decomposed into a plurality of rectangular segments in a matrix so as to execute a processing, each of which is called a tile 1. By executing the processing in the form of the plurality of tiles 1, the unit for one processing is reduced, so that the processing can be executed by means of hardware or software more easily. In particular, as for the hardware, this is effective in reducing the circuit scales of parallel process or LSI.

Basically, the JPEG2000 standard defines that a wavelet transform is executed at the time of image compression. As shown in FIGS. 58 to 60, in order to sequentially execute the wavelet transform, first as shown in FIG. 58, a predetermined region (such as entire frame or each tile 1) of the current image is considered as an object region 2a, and a plurality of lines 4a having a horizontal length which is equivalent to a horizontal size 3a of the object region 2a are prepared for a notice line 5a. Then in the object region 2a, while the notice line 5a is shifted in the vertical direction, each data (pixel) in this notice line 5a is subjected to filtering (high-pass and low-pass) in the vertical direction, followed by filtering (high-pass and low-pass) in the horizontal direction (scanning direction), for extracting high components and low components in each of the vertical direction and the horizontal direction to achieve the Mallat-type band decomposition. At the next stage (second stage), a region where the low components have been confirmed in both of the vertical direction and the horizontal direction is considered as an object region 2b, and as shown in FIG. 59, a plurality of lines 4b having a horizontal length which is equivalent to a horizontal size 3b of the object region 2b are prepared for a notice line 5b. Then while the notice line 5b is vertically shifted within the object region 2b, each data is subjected to filtering in both of the vertical direction and the horizontal direction (high-pass and low-pass) in the same manner as described above, to thereby achieve the Mallat-type band decomposition. Further, at the next stage, (third stage), a region where the low components have been confirmed in both of the vertical direction and the horizontal direction is considered as an object region 2c, and as shown in FIG. 60, while a notice line 5c which is selected from a plurality of lines 4c as shown in FIG. 60 is shifted in the vertical direction within the object region 2c, each data is subjected to filtering in both of the vertical direction and the horizontal direction (high-pass and low-pass) in the same manner as described above, to thereby achieve the Mallat-type band decomposition. Such filtering is performed on the data of a region where low components are confirmed in both of the vertical direction and the horizontal direction, and Mallat-type band decomposition is repeatedly executed.

In such a line-based wavelet method, however, it is necessary to process the respective notice lines 5a to 5c shown in FIG. 58 to FIG. 60 while storing them in a plurality of line memories as hardware. In such a process, if the line-based wavelet process is directly executed on the current image, the horizontal size 3a of the current image (FIG. 58) becomes too large when the image is such a large image that consists of as many as several millions of pixels (e. g., images taken by a digital camera), so that the memory capacity of line memory required for executing the wavelet transform becomes large. Therefore, conventionally, when such a large image that consists of as many as several millions of pixels is to be processed, as described above, the current image is decomposed into a plurality of tiles 1, and the line-based wavelet process is performed for each tile 1. By decomposing (tiling) into tiles 1 in the manner as described, it is possible to reduce the total memory capacity since only a plurality of line memories which are necessary and sufficient for the tile size which is a sub region are required for implementation.

However, there is a disadvantage that in the case of performing the wavelet transform using the plurality of tiles 1 as described above, the smaller the value of compression ratio (%) (i. e., the file size after compression is set smaller), a distortion occurs at the boundary of each tile 1 and a rectangular distortion becomes conspicuous.

By the way, considering the case that the object region 2a is defined in the manner that one frame of the current image is a single tile 1 for processing in order to avoid a distortion from occurring at the boundary of tile, this provides the same situation as the situation where tiling is not executed, so that the memory capacity of the line memory for executing the wavelet transform becomes extremely large as described above.

SUMMARY OF THE INVENTION

It is an object of the present invention to provide a wavelet processing apparatus capable of preventing image distortion from occurring and capable of reducing a memory capacity of a line memory which is required in performing a wavelet transform and a reverse wavelet transform, and a related technique thereto.

According to a first aspect of the present invention, a wavelet processing apparatus includes: a readout block for reading out data in unit of a region obtained by decomposing an image into a plurality of regions while adding to the data within the region excess data of a predetermined data number outside the region; a line-based wavelet transform block for performing a line-based wavelet transform on the data read out at the readout block while decomposing the and of the data in a plurality of decomposition levels; and a data extraction block for extracting the data that has been subjected to the line-based wavelet transform at the line-based wavelet transform block in a predetermined format.

Since data is read out in unit of a region obtained by decomposing an image into a plurality of regions while adding to the data within the region excess data of a predetermined data number outside the region, and a line-based wavelet transform is performed on the data read out at the readout block while decomposing the band of the data in a plurality of decomposition levels, and the data that has been subjected to the line-based wavelet transform is extracted in a predetermined format, it is possible to reduce the memory capacity of the line memory. In addition, the excess data is filtered at a boundary between regions, so that it is possible to prevent an image distortion on the boundary from occurring.

Preferably, the region is a strip region which is decomposed only in a scanning direction of the image.

Since the line-based wavelet transform is executed for each strip region which is decomposed only in the scanning direction of the image, it is possible to execute the line-based wavelet transform at a stroke in the vertical direction. Accordingly, the necessity of reading out data while adding excess data in the vertical direction is eliminate, so that the memory access amount to the line memory can be reduced and the memory capacity of the line memory can be reduced.

Preferably, the region is a block region which is decomposed in a matrix in a scanning direction of the image and a direction orthogonal to the scanning direction.

Since the line-based wavelet transform is executed for each block region which is decomposed in a matrix in the scanning direction of the image and the direction orthogonal to the scanning direction, by executing the wavelet transform in unit of a block region which is smaller than the entire image, it is possible to reduce the memory capacity of the line memory, and additionally by filtering the excess data at a boundary of regions, it is possible to prevent an image distortion on the boundary from occurring. This provides an advantage that EBCOT encoding can be executed without causing any problems, in particular, when a predetermined block region which is called "Precinct" is encoded in the raster scanning order.

Preferably, a wavelet processing apparatus further includes a data readout order conversion block for outputting an image resulting from mirror conversion of an image followed by turning left by 90 degrees, to the readout block.

Since a wavelet processing apparatus further includes a data readout order conversion block for outputting an image resulting from mirror conversion of an image followed by turning left by 90 degrees, to said readout block, it is possible to execute the EBCOT encoding on the strip region without causing any problems, in particular, when a predetermined block region which is called "Precinct" is encoded in the raster scanning order. Accordingly, it is no longer necessary to read out data while adding excess data in the vertical direction, so that the memory access amount to the line memory can be reduced and the memory capacity of the line memory can be reduced.

Preferably, the line-based wavelet transform block executes a line-based wavelet transform while repeatedly and recursively using a line memory which limits to a predetermined number of decomposition levels.

Since the line-based wavelet transform is executed by repeatedly and recursively using a line memory that limits to a predetermined number of decomposition levels, only by repeatedly using a line memory of small memory capacity, band decomposition of deeper decomposition level than the decomposition number supported by the line memory can be executed for executing the line-based wavelet transform. Therefore, even in the case of a wavelet transform which requires band decomposition of deeper decomposition level, it is possible to reduce the memory capacity of the line memory.

Preferably, the line-based wavelet transform block stores intermediate data limited to the predetermined number of decomposition levels and recursively used into a large capacity memory device, thereby executing a line-based wavelet transform.

In the case of decomposing an image to execute a wavelet transform on an entire single screen and performing wavelet transform for a predetermined time using a line-based wavelet transform apparatus which limits to a predetermined number of decomposition levels, if intermediate data is first outputted, and the intermediate data is stored in a large scale memory device, and then read out again for handling as a new single image, it is possible to readily realize the wavelet transform for a single entire screen even with small hardware.

According to a second aspect of the present invention, a wavelet processing apparatus includes: a readout block for reading out data in unit of a region obtained by decomposing a compression image data having subjected to a wavelet transform into a plurality of regions while adding to the data within the region excess data of a predetermined data number outside the region; a line-based reverse wavelet transform block for performing a line-based reverse wavelet transform on the data read out at the readout block; and a data extraction block for extracting the data that has been subjected to the line-based reverse wavelet transform at the line-based wavelet transform block in a predetermined format to reproduce an image.

Since data is read out in unit of a region obtained by decomposing a compression image data having subjected to a wavelet transform into a plurality of regions while adding to the data within the region excess data of a predetermined data number outside the region, a line-based reverse wavelet transform is performed on the data read out, and the data that has been subjected to the line-based reverse wavelet transform is extracted in a predetermined format to reproduce an image, it is possible to reduce the memory capacity of the line memory by performing a reverse wavelet transform in a comparably small region unit, and it is possible to prevent an image distortion from occurring on the boundary by filtering excess data at boundary between regions.

According to a third aspect of the present invention, a wavelet processing apparatus includes: a readout block for reading out data in unit of a region obtained by decomposing a compression image data having subjected to a wavelet transform into a plurality of regions while reading out excess data of a predetermined data number outside the region on either one side from a line memory; a line-based reverse wavelet transform block for performing a line-based reverse wavelet transform on the data read out at the readout block; and a data extraction block for extracting the data that has been subjected to the line-based reverse wavelet transform at the line-based wavelet transform block in a predetermined format to reproduce an image, and storing a predetermined data number of data on the other end of said region into the line memory.

Since data is read out in unit of a region obtained by decomposing a compression image data having subjected to a wavelet transform into a plurality of regions while reading out excess data of a predetermined data number outside the region on either one side from a line memory; a line-based reverse wavelet transform is performed on the data read out; and the data that has been subjected to the line-based reverse wavelet transform is extracted in a predetermined format to reproduce an image, while a predetermined data number of data on the other end of said region is stored into said line memory for use again, it is possible to prevent an image distortion from occurring on the boundary by a simple process of filtering excess data on either outside at the boundary between the regions.

Preferably, the region is a strip region which is decomposed only in a scanning direction of the image.

Since the line-based reverse wavelet transform is executed for each strip region which is decomposed only in the scanning direction of the image, it is possible to execute the line-based reverse wavelet transform at a stroke in the vertical direction. Accordingly, the necessity of reading out data while adding excess data in the vertical direction is eliminate, so that the memory access amount to the line memory can be reduced and the memory capacity of the line memory can be reduced.

Preferably, the region is a block region which is decomposed in a matrix in a scanning direction of the image and a direction orthogonal to the scanning direction.

Since the line-based reverse wavelet transform is executed for each block region which is decomposed in a matrix in the scanning direction of the image and the direction orthogonal to the scanning direction, by executing the reverse wavelet transform in unit of a block region which is smaller than the entire image, it is possible to reduce the memory capacity of the line memory, and additionally by filtering the excess data at a boundary of regions, it is possible to prevent an image distortion on the boundary from occurring. This provides an advantage that EBCOT encoding can be executed without causing any problems, in particular, when a predetermined block region which is called "Precinct" is encoded in the raster scanning order.

Preferably, a wavelet processing apparatus further includes a data writing order conversion block for outputting an image resulting from mirror conversion of an image that has been outputted from the data extraction block followed by turning left by 90 degrees.

Since a wavelet processing apparatus further includes a data readout order conversion block for outputting an image resulting from mirror conversion of an image followed by turning left by 90 degrees, it is possible to execute the EBCOT encoding on the strip region without causing any problems, in particular, when a predetermined block region which is called "Precinct" is encoded in the raster scanning order. Accordingly, it is no longer necessary to read out data while adding excess data in the vertical direction, so that the memory access amount to the line memory can be reduced and the memory capacity of the line memory can be reduced.

Preferably, the line-based reverse wavelet transform block executes a line-based reverse wavelet transform while repeatedly and recursively using a line memory which limits to a predetermined number of decomposition levels.

Since the line-based reverse wavelet transform is executed by repeatedly and recursively using a line memory that limits to a predetermined number of decomposition levels, only by repeatedly using a line memory of small memory capacity, band decomposition of deeper decomposition level than the decomposition number supported by the line memory can be executed for executing the line-based reverse wavelet transform. Therefore, even in the case of a reverse wavelet transform that requires band decomposition of deeper decomposition level, it is possible to reduce the memory capacity of the line memory.

Preferably, the line-based reverse wavelet transform block stores intermediate data limited to the predetermined number of decomposition levels and recursively used into a large capacity memory device, thereby executing a line-based reverse wavelet transform.

In the case of decomposing an image to execute a reverse wavelet transform on an entire single screen and performing reverse wavelet transform for a predetermined time using a line-based reverse wavelet transform apparatus which limits to a predetermined number of decomposition levels, if intermediate data is first outputted, and the intermediate data is stored in a large scale memory device, and then read out again for handling as a new single image, it is possible to readily realize the reverse wavelet transform for a single entire screen even with small hardware.

In the present specification, "scanning direction" written with no special definition means a line direction when a scanning line of an image is scanned.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 50A to 50C show an operation of the wavelet processing method according to the fifth embodiment of the present invention;

FIG. 72 shows excess data at a third decomposition level when band synthesis is executed for each block region;

FIG. 73 shows excess data at a second decomposition level when the band synthesis is executed for each block region;

FIG. 74 shows excess data at a first decomposition level when the band synthesis is executed for each block region.

DESCRIPTION OF THE PREFERRED EMBODIMENTS

Principle of Decomposition Side

A wavelet processing method at a decomposition side of the present invention (i. e., wavelet transforming method) aims at reducing the total memory capacity of a line memory by reducing the size of a line memory in a horizontal direction (scanning direction) used in a line-based wavelet process. A Mallat-type band decomposition is executed by decomposing data (e. g., pixel data for one frame of a current image) along the horizontal direction (scanning direction), and fetching excess input data lying in the neighboring decomposition section for filtering together in order to prevent an image distortion from occurring between the decomposition regions. In this case, only using the line memory required when the decomposition level for which the Mallat-type band decomposition is executed is limited to a predetermined number of decomposition levels (e. g., three-decomposition levels), and by executing the Mallat-type band decomposition for a number of decomposition levels by recursively using this line memory, it is possible to perform the line-based wavelet process for a sufficient number of decomposition levels with a line memory of such a small memory capacity.

Regarding Excess Data

In general, a wavelet transform (decomposition side) used in the standard of measure, JPEG2000-Part1 is associated with the following rules (1) and (2):

(1) even-numbered output data is low-pass data, and odd-numbered output data is high-pass data; and (2) according to the JPEG-Part1-AMD1, the origin of a coordinate is set at the upper left corner of the current image, and first data in this output data is low-pass data.

Herein, with respect to a data column which is an object to be stored in a line memory and subjected to filtering (hereinafter, referred to as "notice data column"), in the case where the data at least at the end point is subjected to the folding calculation so as to calculate high-pass data or low-pass data, in order to prevent an image distortion from occurring at a boundary portion as described above, a certain number of excess data on the outer side of the notice data column is read out to perform the filtering (a part denoted by dispersed dots in FIGS. 1 to 8). In this case, the excess data column which should be read out can be classified into four patterns as shown in FIGS. 1 to 4 or FIGS. 5 to 8 depending on the data number (even number or odd number) or the data starting point (even-numbered position or odd-numbered position).

Figure 1:
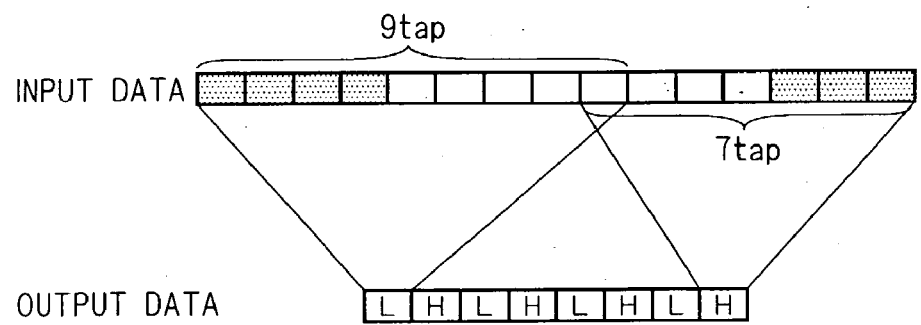
FIG. 1 shows an operation example of 9×7 filtering in a general line-based wavelet transform.
Figure 2:
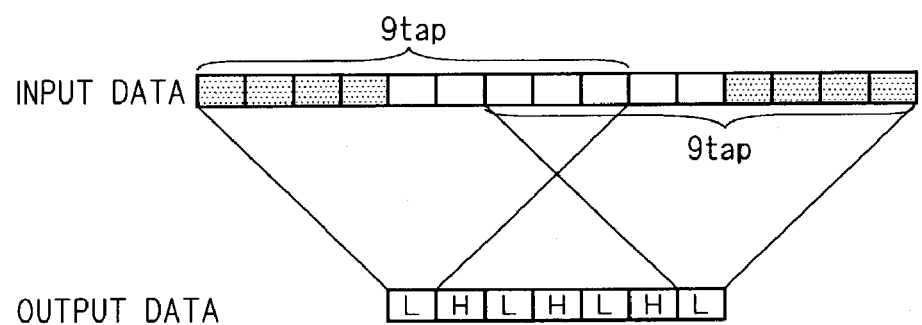
FIG. 2 shows an operation example of the 9×7 filtering in the general line-based wavelet transform.
Figure 3:
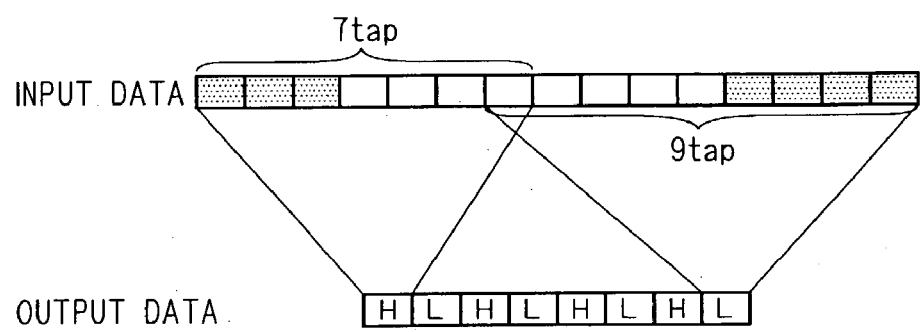
FIG. 3 shows an operation example of the 9×7 filtering in the general line-based wavelet transform.
Figure 4:
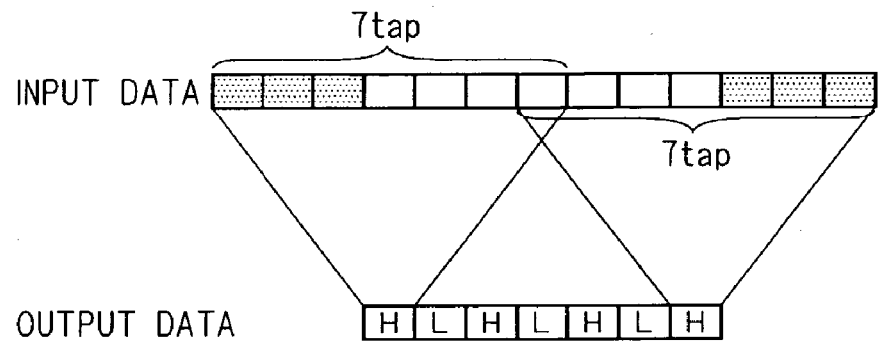
FIG. 4 shows an operation example of the 9×7 filtering in the general line-based wavelet transform.

Herein, FIGS. 1 to 4 show the relationship between input and output data at the decomposition side when a 9×7 filter is used. FIG. 1 shows a case where the notice data column starts at even-numbered data (low-pass data L) and the number of data is even. FIG. 2 shows a case where the notice data column starts at even-numbered data (low-pass data L) and the number of data is odd. FIG. 3 shows a case where the notice data column starts at odd-numbered data (high-pass data H) and the number of data is even. FIG. 4 shows a case where the notice data column starts at odd-numbered data (high-pass data H) and the number of data is odd. That is, when the 9×7 filter is used, four patterns shown in FIGS. 1 to 4 may be occurred.

Figure 5:
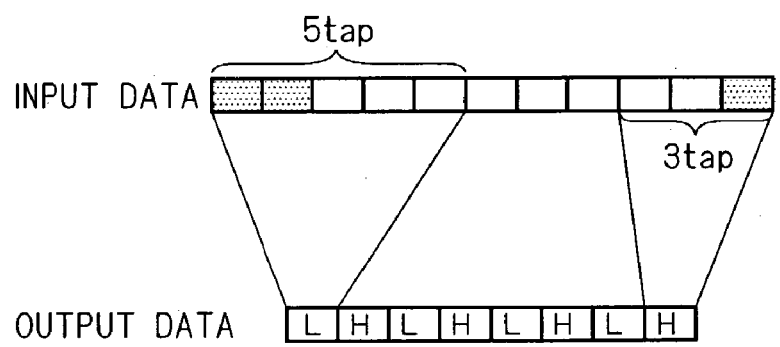
FIG. 5 shows an operation example of 5×3 filtering in the general line-based wavelet transform.
Figure 6:
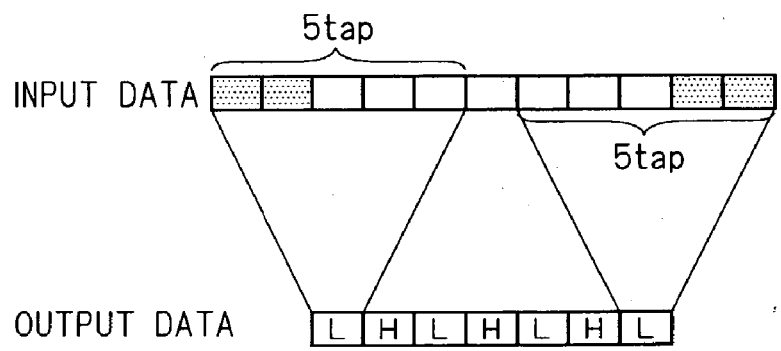
FIG. 6 shows an operation example of the 5×3 filtering in the general line-based wavelet transform.
Figure 7:
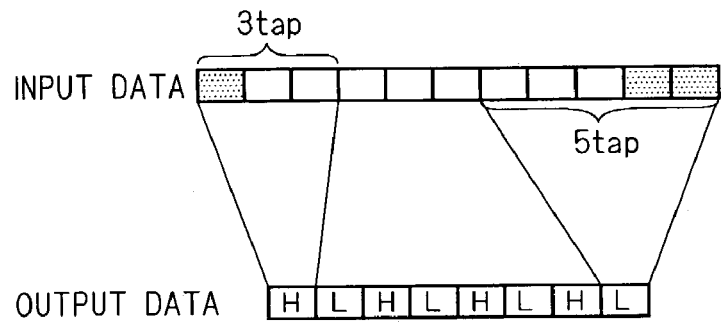
FIG. 7 shows an operation example of the 5×3 filtering in the general line-based wavelet transform.
Figure 8:
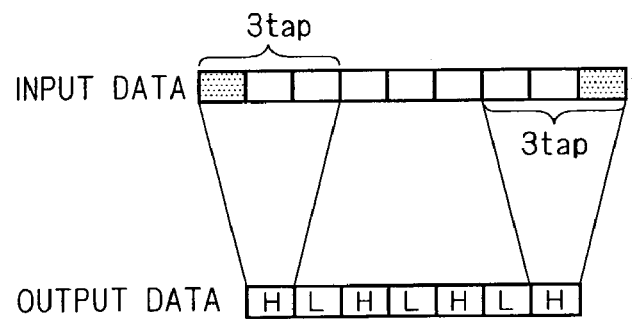
FIG. 8 shows an operation example of the 5×3 filtering in the general line-based wavelet transform.

Herein, as shown in FIGS. 1 to 4, in a case where low-pass data L among output data is to be generated, as a number of data to be sampled in filtering, 9Tap including excess four data on both right and left sides of the notice pixel among the original data (the part denoted by dispersed dots) is required, whereas in a case where high-pass data H among output data is to be generated, as a number of data to be sampled in filtering, 7Tap including excess three data on both right and left sides of the notice pixel among the original data (the part denoted by dispersed dots) is required. Therefore, in the case of FIG. 1, since first data in the output data is low-pass data L (requiring input data of 9Tap), as the input data for filtering, four excess data on its left side (the part denoted by dispersed dots) is required, and since last data in the output data is high-pass data H (requiring input data of 7Tap), as the input data for filtering, three excess data on its right side (the part denoted by dispersed dots) is required. Likewise, in the case of FIG. 2, as the input data for filtering, each four excess data on its right and left sides (the part denoted by dispersed dots) is required. In the case of FIG. 3, as the input data for filtering, three excess data on its left side and four excess data on its right side (the part denoted by dispersed dots) is required. In the case of FIG. 4, as the input data for filtering, each three excess data on its right and left sides (the part denoted by dispersed dots) is required FIGS. 5 to 8 show the relationship between input and output data at the decomposition side when a 5×3 filter is used. FIG. 5 shows a case where the notice data column starts at even-numbered data (low-pass data L) and the number of data is even. FIG. 6 shows a case where the notice data column starts at even-numbered data (low-pass data L) and the number of data is odd. FIG. 7 shows a case where the notice data column starts at odd-numbered data (high-pass data H) and the number of data is even. FIG. 8 shows a case where the notice data column starts at odd-numbered data (high-pass data H) and the number of data is odd. That is, when the 5×3 filter is used, four patterns shown in FIGS. 5 to 8 may be occurred. With respect to this 5×3 filter, in the case of FIG. 5, two excess data on its left side and one excess data on its right side (the part denoted by dispersed dots) is required as the input data. In the case of FIG. 6, each two excess data on its right and left sides (the part denoted by dispersed dots) is required as the input data for filtering. In the case of FIG. 7, one excess data on its left side and two excess data on its right side (the part denoted by dispersed dots) is required as the input data. In the case of FIG. 8, each one excess data on its right and left sides (the part denoted by dispersed dots) is required as the input data for filtering.

In both of the above-described 9×7 filter (FIGS. 1 to 4) and 5×3 filter (FIGS. 5 to 8), when they are designed to support data reading of four patterns, a circuit for input control of wavelet transform will be complicated. For convenience of description, in the present wavelet processing method, as the notice data column to be stored in the line memory, only the data that starts at an even numbered position and the number of data is even is considered (FIG. 1 or 5).

Regarding Recursive Use of Line Memory

Figure 9:
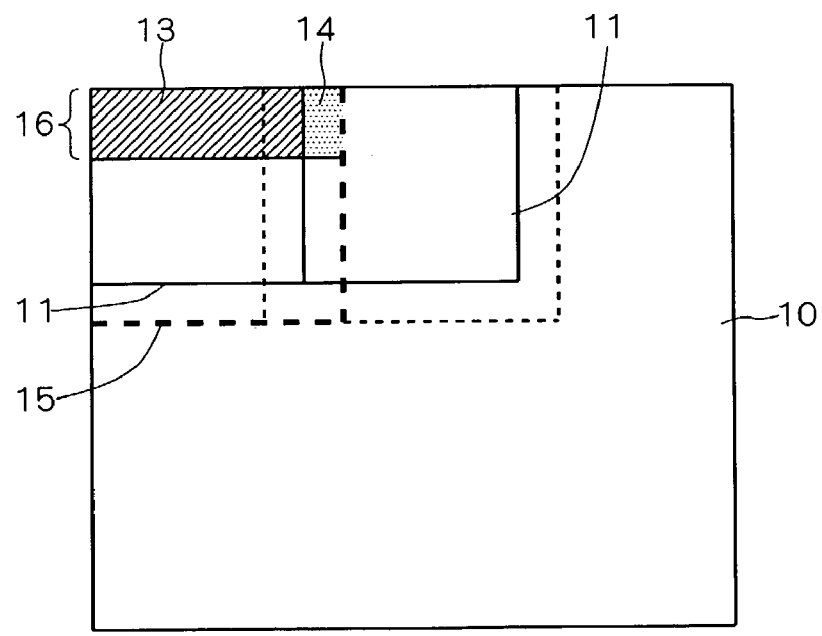
FIG. 9 shows an operation of reading out excess data for each block region.
Figure 10:
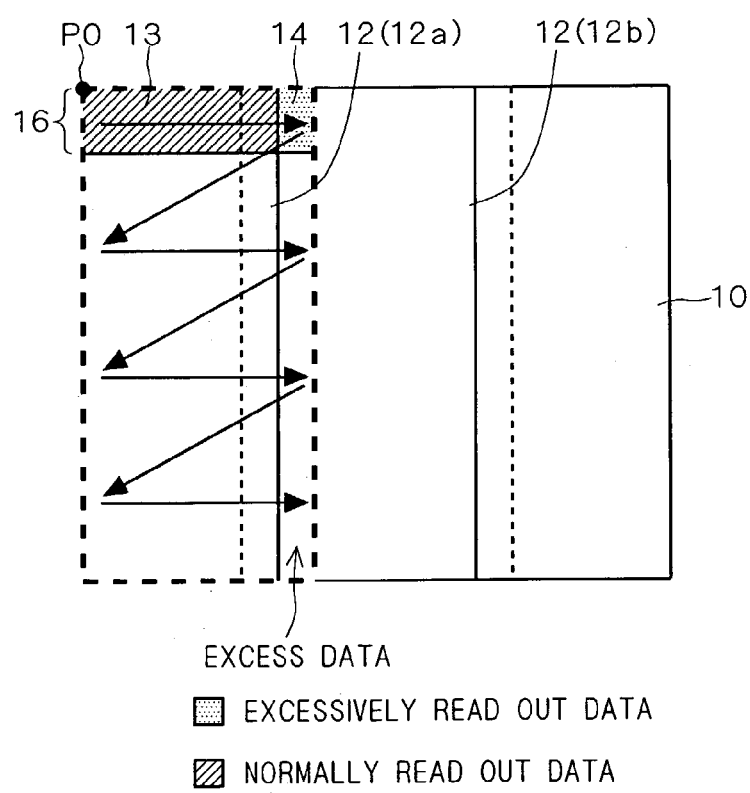
FIG. 10 shows an operation of reading out excess data for each strip region.

Next, a principle of recursively reading out data using a line memory having small memory capacity will be described. FIG. 9 shows a case where a line-based wavelet process is executed while decomposing an object region 10 into a plurality of block regions 11 in a matrix in vertical and horizontal directions. FIG. 10 shows a case where the line-based wavelet process is executed while decomposing the object region 10 into a plurality of strip regions 12 only in the horizontal direction (scanning direction).

First as shown in FIG. 9, in the case where the data is divide into the plurality of block regions 11 in a matrix, in order to prevent an image distortion from occurring at a decomposition boundary between the block regions 11, as described above, it is necessary to read out not only data 13 which is normally read out (hatched portion) but also excess data 14 positioned outside each block region 11 (e. g., a part denoted by dispersed dots in the figure) (see FIGS. 5 to 8). On the other hand, when the block regions 11 are decomposed in a matrix as shown in FIG. 9, not only the excess data 14 in the horizontal direction should be read out in an overlapping manner, but also excess data 15 in the vertical direction should be readout in an overlapping manner. Accordingly, when a wavelet process is executed while storing the data denoted by a reference numeral 16 in the figure in the line memory, not only the excess data 14 in the horizontal direction but also the excess data 15 in the vertical direction should be accessed by a memory, so that the overhead becomes large in the data for memory access.

In view of this, as shown in FIG. 10, only the excess data 14 in the horizontal direction is read out in an overlapping manner and the image data is decomposed only in the horizontal direction into the plurality of strip regions 12, whereby the object region 10 is sequentially processed in a stroke from the upper end to the lower end. By way of this, it is no longer necessary to read out the excess data 15 in the vertical direction, and the line memory becomes easy to be handled, and hence it is possible to prevent the process from becoming complicated.

Recursive Use of Line Memory

Figure 11:
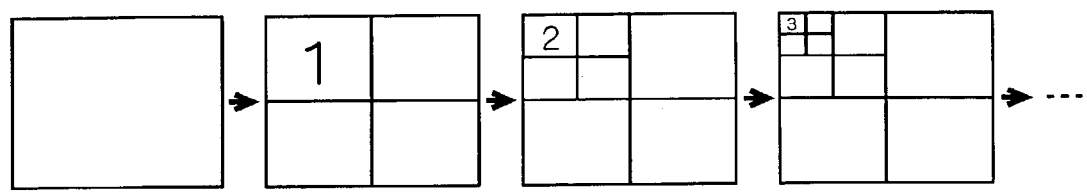
FIG. 11 shows an operation of band decomposition of a plurality of decomposition levels in a basic wavelet transform.

As shown in FIG. 11, when a wavelet process is executed on a plurality of decomposition levels, as the number of decomposition levels increases, the number of the excess data 14 increases exponentially.

Figure 12:
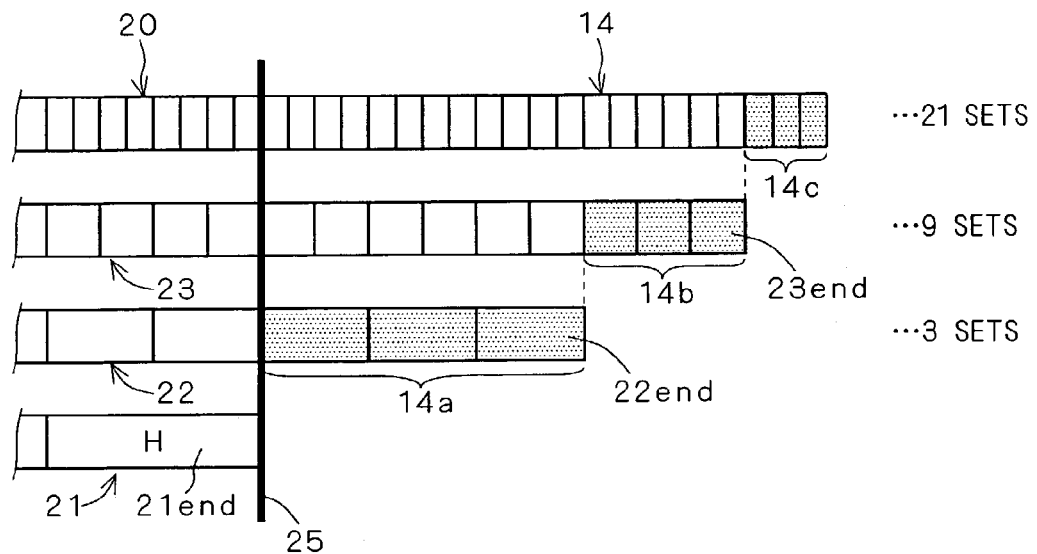
FIG. 12 shows excess data required at a trailing end side when the number of decomposition levels is three and a 9×7 filter is used.

Consideration will be given of the memory access of the excess data 14 in the right end direction. In a 9×7 filter, the excess data 14 when the number of decomposition levels of the Mallat-type band decomposition is three is as shown in FIG. 12. In FIG. 12, a reference numeral 20 denotes a notice data column, a reference numeral 21 denotes a data column at a third decomposition level of the Mallat-type band decomposition, a reference numeral 22 denotes a data column at a second decomposition level of the Mallat-type band decomposition, and a reference numeral 23 denotes a data column at a first decomposition level of the Mallat-type band decomposition, respectively.

As described above, since the data column of the third decomposition level 21 starts at even-numbered data and the data number is limited to an even number, last data 21end in the third decomposition level 21 is high-pass data H (see FIG. 1). Therefore, as shown in FIG. 1, at the position corresponding to the last data 21end, data of 7Tap from the next upper level data column of second decomposition level 22 is required. Accordingly, in the second decomposition level 22, three sets of data are required as excess data 14a.

Next at the second decomposition level 22, since the last data of the excess data 14a is low-pass data L, data of 9Tap from the next upper level data column of first decomposition level 23 is required. Accordingly, at the first decomposition level 23, four sets of data are required as excess data 14b. Likewise, at the first decomposition level 23, since last data 22end of the excess data 14b is low-pass data L, data of 9Tap from the next upper zero decomposition level 23 is required, and hence four sets of data are required as excess data 14c.

Consequently, when the number of decomposition levels of the Mallat-type band decomposition is three, 21 sets of excess data 14 are required outside the boundary 25 at the zero decomposition level, and nine and three sets of excess data are required at the first and the second decomposition levels, respectively.

The number of excess data to be read out on the right side when the input (low-pass) data starts at an even number and the number of the input (low-pass) data is limited to even number, can be expressed by the following general expression (1). Herein, $R_n$ in the expression (1) means the number of data of the excess data 14 that should be excessively read out at the zero decomposition level (initially) when the number of decomposition levels of the Mallat-type band decomposition in the wavelet transform is represented by "n (n=1, 2, ...) decomposition level(s).

$$R_{n-1} = 2R_n + 3, \quad R_1 = 3$$

$$\therefore R_n = 3 \cdot 2^n - 3 \quad (1)$$

From this expression (1), the number of data to be excessively read at the zero decomposition level 20 varies depending on the number of decomposition levels of the wavelet (WT number) as shown in Table 1 below.

TABLE 1

| WT number | Data number to be excessively read out | Total |
|---|---|---|
| 1 | 3 | 3 |
| 2 | 9 | 12 |
| 3 | 21 | 33 |
| 4 | 45 | 78 |
| 5 | 93 | 171 |
| 6 | 189 | 360 |
| 7 | 381 | 741 |
| 8 | 765 | 1506 |
| 9 | 1533 | 3039 |
| 10 | 3069 | 6108 |

In Table 1, the item "total" represents a sum total of the excess data 14 (data number to be excessively read out) for each number of decomposition level of band decomposition (WT number=n). For example, when the number of decomposition level (WT number) is three, the number of data of the excess data 14 is 21 which is the number for the zero decomposition level, and three and nine sets of excess data 14 is required at the first and the second decomposition levels, respectively, resulting that as a capacity of the line memory, a storage area corresponding to the total (sum total) of 3+9+21=33 of excess data 14 as a whole is excessively required.

Figure 13:
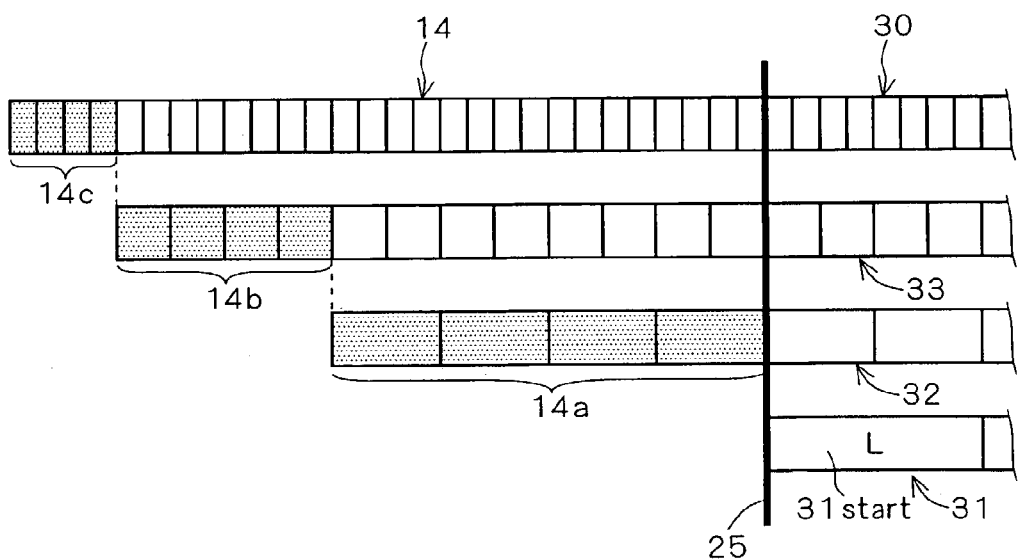
FIG. 13 shows excess data required at a leading end side when the number of decomposition levels is three and the 9×7 filter is used.

The overhead of memory access of the left end data when the Mallat-type band decomposition of three-decomposition levels is executed by means of the 9×7 filter is as shown in FIG. 13. That is, first data 31start of the third decomposition level 31 is low-pass data L, and hence 9Tap is required for calculating this data 31start. Therefore, the data number of the excess data 14a to be excessively readout in the leading end direction of the second decomposition level is four. Likewise, each four sets of excess data 14b and 14c are added at the second decomposition level 32 and first decomposition level 33, the excess data 14 can be expressed by the following general expression (2). It is assumed that the input (low-pass) data starts at an even numbered position, and the number of input (low-pass) data is even.

$$L_{n-1} = 2L_n + 4, \quad L_1 = 4$$

$$\therefore L_n = 2^{n+2} - 4 \quad (2)$$

From this expression (2), the number of data to be excessively read at the zero decomposition level 30 varies depending on the number of decomposition levels of the wavelet (WT number) as shown in Table 2 below.

TABLE 2

| WT number | Data number to be excessively read out | Total |
|---|---|---|
| 1 | 4 | 4 |
| 2 | 12 | 16 |
| 3 | 28 | 44 |
| 4 | 60 | 104 |
| 5 | 124 | 228 |
| 6 | 252 | 480 |
| 7 | 508 | 988 |
| 8 | 1020 | 2008 |
| 9 | 2044 | 4052 |
| 10 | 4092 | 8144 |

Figure 14:
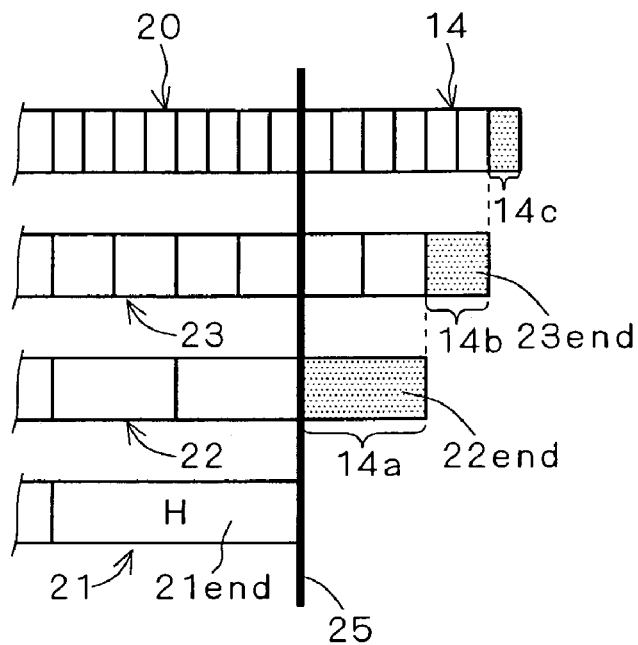
FIG. 14 shows excess data required at a trailing end side when the number of decomposition levels is three and a 5×3 filter is used.

Likewise, in the case of the 5×3 filter, assuming that the Mallat-type band decomposition is executed in three-decomposition levels, the right side excess data 14 is as shown in FIG. 14, and depending on the number of decomposition level (WT number=n), the data number of the excess data 14 is as shown in the following expression (3) and Table 3.

$$R_{n-1}=2R_n+1, R_1=1$$

$$\therefore R_n=2^n-1 \quad (3)$$

TABLE 3

| WT number | Data number to be excessively read out | Total |
|---|---|---|
| 1 | 1 | 1 |
| 2 | 3 | 4 |
| 3 | 7 | 11 |
| 4 | 15 | 26 |
| 5 | 31 | 57 |
| 6 | 63 | 120 |
| 7 | 127 | 247 |
| 8 | 255 | 502 |
| 9 | 511 | 1013 |
| 10 | 1023 | 2036 |

Figure 15:
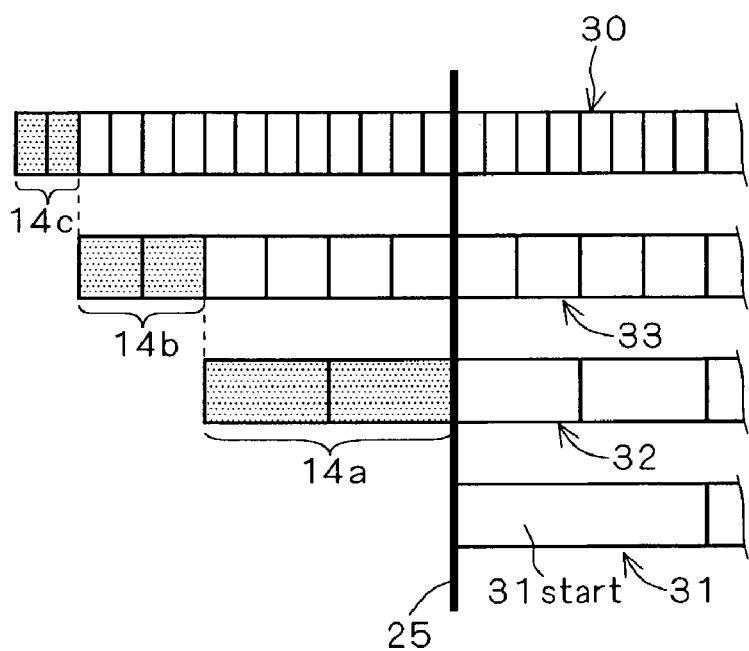
FIG. 15 shows excess data required at a leading end side when the number of decomposition levels is three and the 5×3 filter is used.

Also the left side excess data 14 is as shown in FIG. 15, and depending on the number of decomposition level (WT number=n), the data number of the excess data 14 is as shown in the following expression (4) and Table 4.

$$L_{n-1}=2L_n+2, L_1=2$$

$$\therefore L_n=2^{n+1}-2 \quad (4)$$

TABLE 4

| WT number | Data number to be excessively read out | Total |
|---|---|---|
| 1 | 2 | 2 |
| 2 | 6 | 8 |
| 3 | 14 | 22 |
| 4 | 30 | 52 |
| 5 | 62 | 114 |
| 6 | 126 | 240 |
| 7 | 254 | 494 |
| 8 | 510 | 1004 |
| 9 | 1022 | 2026 |
| 10 | 2046 | 4072 |

It can be recognized that as shown in the expressions (1) to (4) and Tables 1 to 4, as the number of decomposition level by which the band decomposition is executed (WT number=n) increases, the total (sum total) of the excess data 14 increases exponentially. Therefore, in the present invention, for the purpose of reducing the total (sum total) of the excess data 14 as small as possible, some ideas are devised in the manner of reading out an original image. In the following, several embodiments will be described.

First Embodiment

Figure 16:
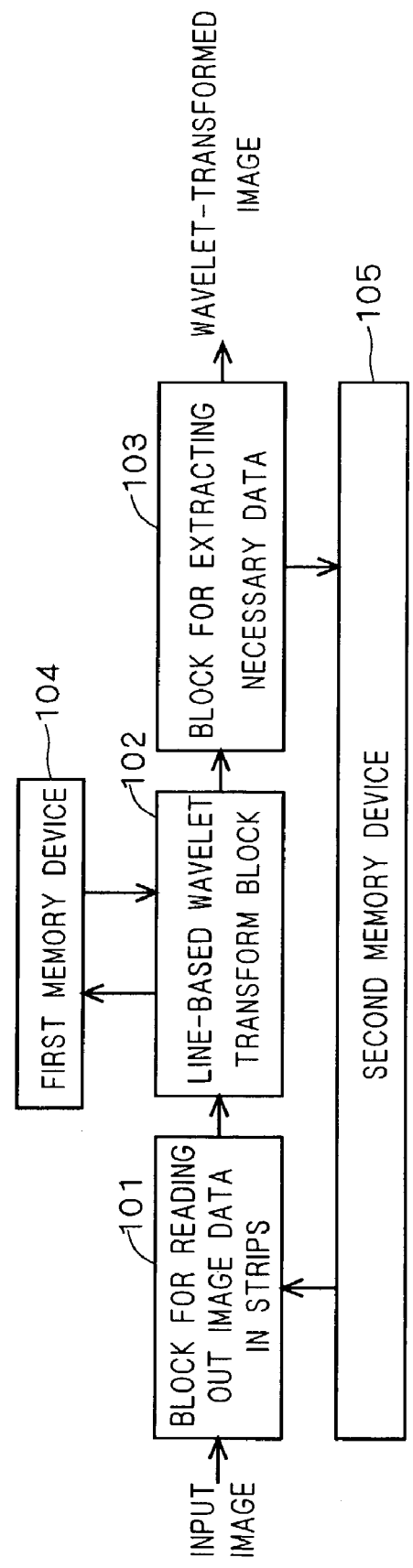
FIG. 16 is a block diagram showing a wavelet processing apparatus according to a first embodiment of the present invention.

In a first embodiment of the present invention, a wavelet processing apparatus shown in FIG. 16 is used. This wavelet processing apparatus includes: a block (readout block) 101 for reading out data in strip manner from an input image; a block (line-based wavelet transform block) 102 for performing a line-based wavelet transform on the data read out at the readout block 101; a block (data extraction block) 103 for extracting necessary data from the line-based wavelet transform block 102; a first memory device 104 for temporarily storing data when the wavelet transform is performed in the line-based wavelet transform block 102; and a second memory device 105 (large capacity memory device) 105 corresponding to a main memory which stores data for repeatedly and recursively performing wavelet transform on the output result from the data extraction block 103 as will be described later.

Then, in the present embodiment, as shown in FIG. 10 described above, the readout block 101 is designed to decompose the object region 10 only in the horizontal direction (scanning direction) into the plurality of strip regions 12 and read out only the excess data 14 in the horizontal direction for performing the line-based wavelet process in an overlapping manner, and the object region 10 is sequentially processed at a stroke from the upper end to the lower end.

In this case, a smaller number of pixels in the horizontal direction are required compared to the case where one frame in its entirety is subjected to the wavelet transform as one object region. Accordingly, even when the Mallat-type band decomposition is repeated until the data size finally reaches, for example, 128×128, the number of decomposition levels required in this case (WT number in Tables 1 to 4) is smaller than that of the case where one frame in its entirety is subjected to the wavelet process. Therefore, the total number of the excess data 14 (right end columns in Tables 1 to 4) required for the line memory can be reduced exponentially.

In addition, since the necessity of reading out the excess data in the vertical direction, in particular (see reference numeral 15 in FIG. 9) is eliminated, it is possible to easily handle the line memory, and complication of the process can be avoided.

Figure 17:
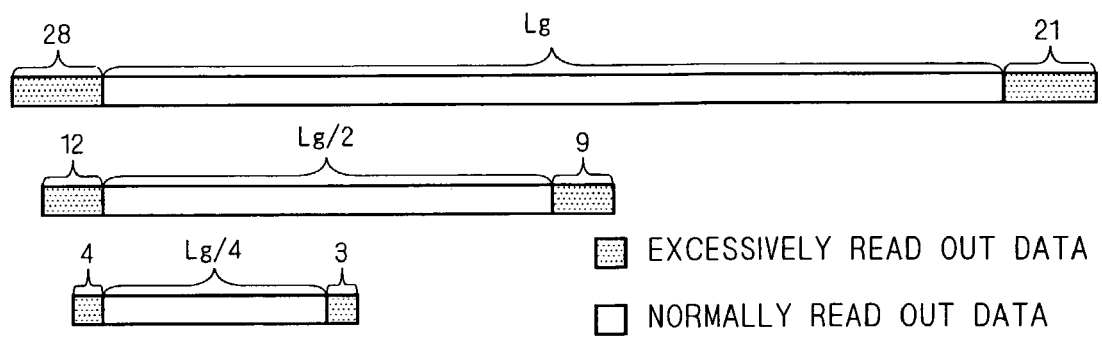
FIG. 17 shows excess data required in a wavelet processing method according to the first embodiment of the present invention.

In the case where the wavelet transform is executed in 10 decomposition levels, as shown in Tables 1 to 4, in the case of the 9×7 filter, the right end is 6108 and the left end is 8144, while in the case of the 5×3 filter, the right end is 2036 and the left end is 4072. When reading out data in the manner as shown in FIG. 10 (or FIG. 9), the overhead increases in correspondence with the excess data 14. In view of this, according to the present embodiment, as shown in FIG. 17, a circuit which executes a wavelet transform process of three-decomposition levels is repeatedly and recursively used. Herein, Lg represents a size of one side of a single strip resulting from decomposing into strips in the horizontal direction as shown in FIG. 10.

FIG. 17 shows the excess data 14 required on the right side when the 9×7 filter is used, and three, nine and 21 sets (see Table 1) of excess data 14 are required in the second to zero decomposition levels, respectively. Though not shown, the excess data 14 required on the left side when the 9×7 filter is used is four, 12 and 18 sets (see Table 2). Also in the case of using the 5×3 filter, one, three and seven sets (see Table 3) of excess data 14 are required on the right side, and two, eight and 22 sets (see Table 4) of excess data 14 are required on the left side.

As a result, the number of excess data 14 can be reduced when a wavelet transform of three-decomposition levels is employed, and by repeating this wavelet transform, the capacity of line memory can be reduced compared to the case where a wavelet transform is executed in a plurality of decomposition levels such as 10 decomposition levels at once.

For example, in image sizes having one side in the horizontal direction of more than 2048, if it is attempted to repeat the Mallat-type band decomposition in a non-tiling manner (method not decomposing into tiles) until the data size is finally 128×128, five or more number of times of wavelet execution is required in the 9×7 filter. Furthermore, in the case of compressing an image formed from five millions or more pixels such as an image taken by a digital camera by a wavelet transform, the number of decomposition levels for band decomposition dramatically increases.

In such a case, after executing band decomposition for a limited number of times at the line-based wavelet transform block 102, output data from the data extraction block 103 is stored in the second memory device 105 to allow to pass through the readout block 101 and the line-based wavelet transform block 102 for repetition of execution of the wavelet transform. This makes it possible to execute the wavelet transform of sufficient decomposition levels even with a line memory of small capacity. For example, when using a line memory which supports only three-decomposition levels of band decomposition, the line memory merely need to have an extra storage area corresponding to the total of 77 (33 for the 5×3 filter) sets, that is the sum total of 3+9+21=33 sets from Table 1 and 4+12+28=44 sets from Table 2 for processing a single line.

Consequently, in the present embodiment, it is possible to reduce the memory capacity of the line memory as small as possible.

Second Embodiment

Figure 19:
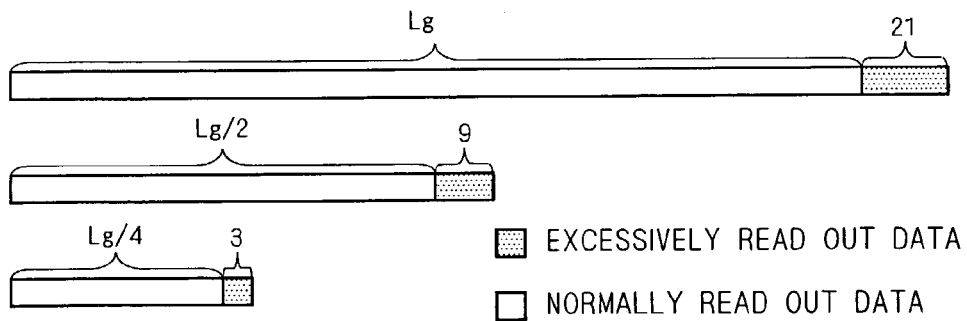
FIG. 19 shows excess data required on a trailing end to be stored in a line memory supporting three-decomposition levels in a wavelet processing method according to a second embodiment of the present invention.
Figure 20:
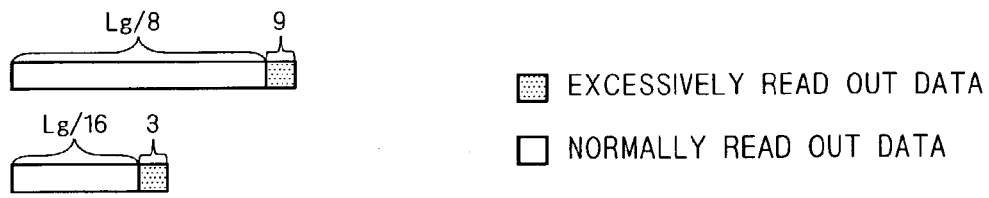
FIG. 20 shows excess data required on a trailing end side to be stored in a line memory supporting two-decomposition levels in the wavelet processing method according to the second embodiment of the present invention.

In the first embodiment, by repeatedly performing the band decomposition using a line memory in which the number of decomposition levels is limited to three when performing the wavelet transform at each strip region 12, band decomposition of more than four-decomposition levels is enabled. In contrast to this, according to the present embodiment, an apparatus for executing a wavelet transform of three-levels as shown in FIG. 19 and an apparatus for executing a wavelet transform of two-levels as shown in FIG. 20 are used together for the purpose of reducing the number of entire memory accesses since an extra storage area required for processing one line is merely the area corresponding to 3+9+21=33 sets (11 for the 5×3 filter) from Table 1 the decomposition number of wavelet transform is three, and the area corresponding to 3+9=12 sets (four for the 5×3 filter) when the decomposition number of wavelet transform is two.

Figure 18:
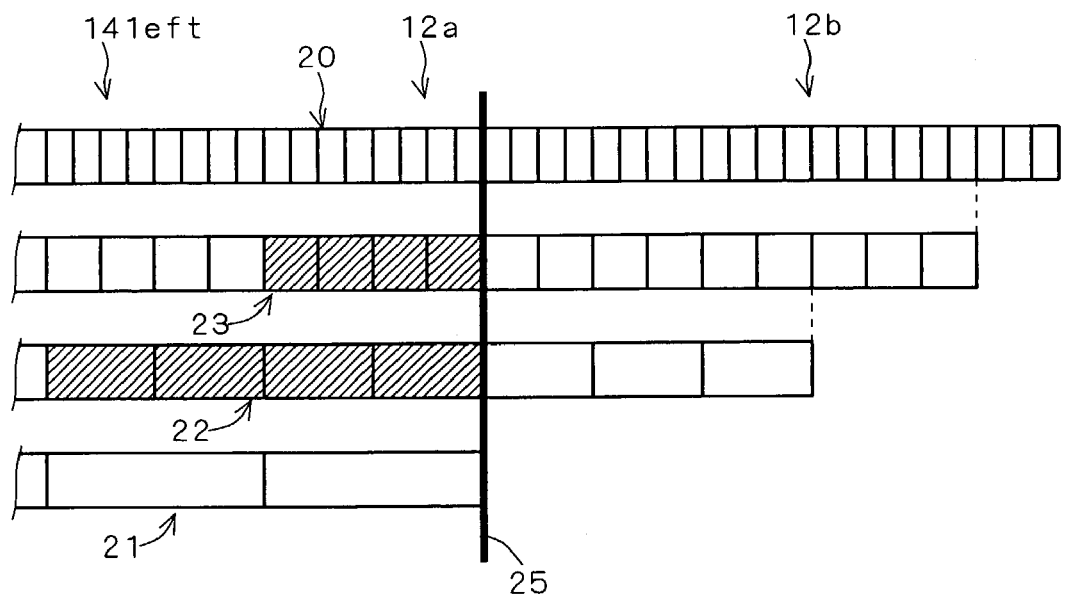
FIG. 18 shows excess data used from a strip region of a leading end side in the wavelet processing method according to the first embodiment of the present invention.

In this case, if it is so arranged that the data from the original data is read out one by one at the both ends, the efficiency significantly deteriorates. For addressing this problem, in the case of sequentially performing a wavelet transform of a small number of decomposition levels (three-decomposition levels in the example of FIG. 17) from the left to the right with respect to the each object region (strip region) 12 which is decomposed into strips, utilizing the fact that before performing the wavelet transform on the notice strip region 12 (only three-decomposition levels), the wavelet transform for the left side strip region (only three-decomposition levels) has completed, as shown by the hatched portion in FIG. 18, as left excess data 14left of the notice strip region 12*b*, the data that has been calculated for the left strip region 12*a* that has been already subjected to the wavelet transform. That is, in the wavelet transform at each strip region 12*a*, data corresponding to four segments on the inner (left) side of the boundary 25 of the right end is written into the memory for use in the filtering operation at the left end of the next strip region 12*b*. As a result of this, it is no longer necessary to read out data for the left side filtering at each strip region 12*b*, so that the memory access and memory capacity can be saved.

For example, in the case where the wavelet transform is started at an upper left end point P0 shown in FIG. 10, after performing band decomposition for a predetermined number of decomposition levels on the strip region 12*a* at the left end, the next strip region 12*b* is processed in the similar manner. In this case, when the wavelet transform is executed for five times (decomposition levels), Lg in FIG. 19 need to have only multiples of 32. However, for facilitating the process, it is preferred that Lg has factors which are two to the powers. On the other hand, in the case where the wavelet transform is executed for more than five times, after finishing the wavelet transform for the entire one screen corresponding to five times, band decomposition for five times (decomposition levels) can be repeatedly and recursively executed in accordance with the manner as shown in FIGS. 19 and 20.

Third Embodiment

Figure 21:
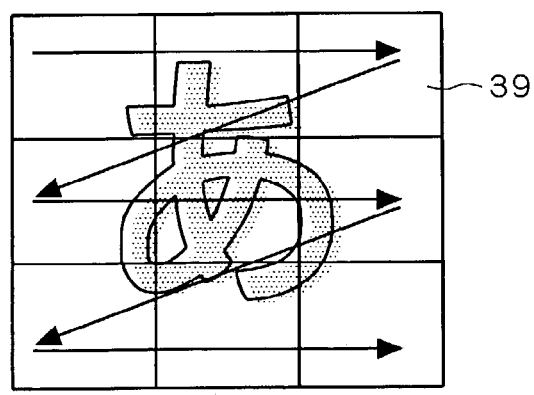
FIG. 21 shows a wavelet processing method according to a third embodiment of the present invention.

In the first embodiment and the second embodiment as described above, for the purpose of eliminating the necessity of handling the excess data in the vertical direction (see reference numeral 15 in FIG. 9), the wavelet transform is executed at a stroke on the strip regions 12 (12*a*,12*b*) in an image of one frame along the vertical direction. However, assuming that a predetermined block region 39 which is called "Precinct" shown in FIG. 21 is encoded in a predetermined raster scanning order, when each of strip regions 12 having decomposed into strips is subjected to wavelet transform as is in the above-described first and second embodiments, it is impossible to start the EBCOT encoding unless the entire one screen has been subjected to wavelet transform. To the contrary, when the image is decomposed in blocks as shown in FIG. 9, for example, in the vertical direction and the horizontal direction in a matrix to allow overhead of memory access in the vertical direction, it is possible to start the EBCOT encoding at the point of time when the wavelet transform for the part corresponding to the precinct39 has completed. Reading left as top and right as bottom, this case corresponds to the case of the wavelet transform process in block decomposing as shown in FIG. 21.

As described above, even when decomposing into blocks in a matrix, by repeatedly and recursively using the apparatus (line memory or the like) where the number of decomposition levels for band decomposition is limited to a small number (e. g., WT number which is the number of decomposition levels is three) as is the first and second embodiments to realize the band decomposition of deeper decomposition levels, the memory capacity of the line memory can be reduced.

Figure 22:
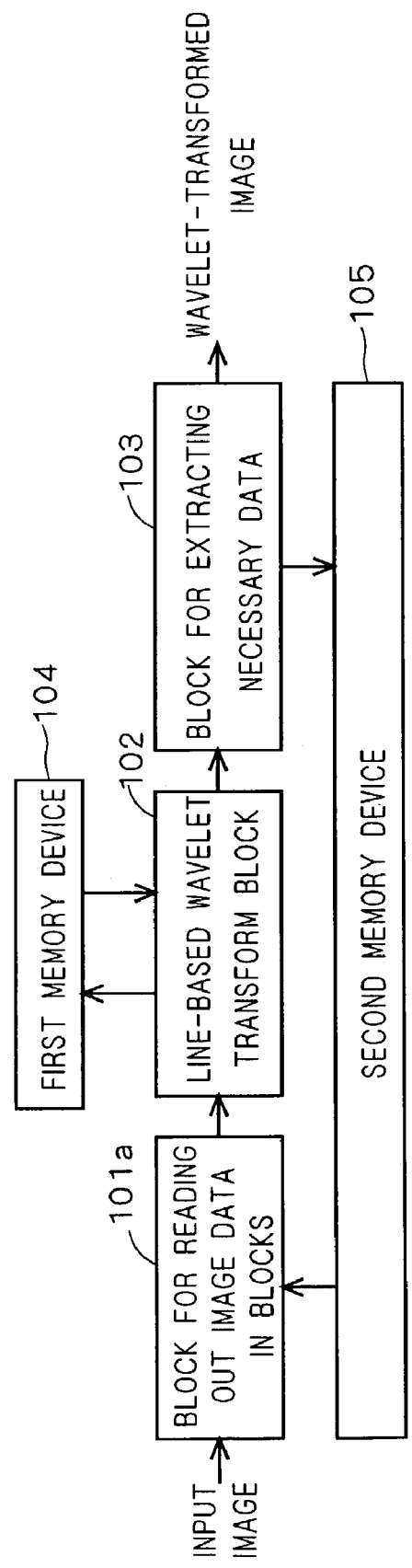
FIG. 22 is a block diagram showing a wavelet processing apparatus according to the third embodiment of the present invention.

As an arrangement for realizing such a process, a wavelet processing apparatus shown in FIG. 22 is used. In this case, in place of the readout block 101 in the wavelet processing apparatus shown in FIG. 16, a readout block 101a for reading out image data in blocks is preferably used.

Fourth Embodiment

Figure 23:
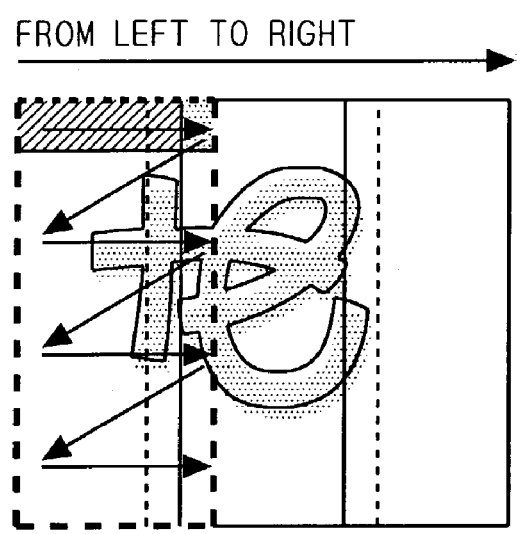
FIG. 23 shows a data readout order converting operation in a wavelet processing method according to a fourth embodiment of the present invention.

FIG. 23 shows a wavelet processing method according to a fourth embodiment of the present invention. According to the wavelet processing method of the present embodiment, when the Precinct is encoded in the raster scanning order as shown in FIG. 23, and the image is to be scanned while decomposing it into the strip regions 12 as is the case of the first embodiment, an image which is obtained from the original image shown in FIG. 21 by subjecting it to mirror reversing and turning counterclockwise by 90 degrees, is decomposed into the strip regions 12 for scanning.

Figure 24:
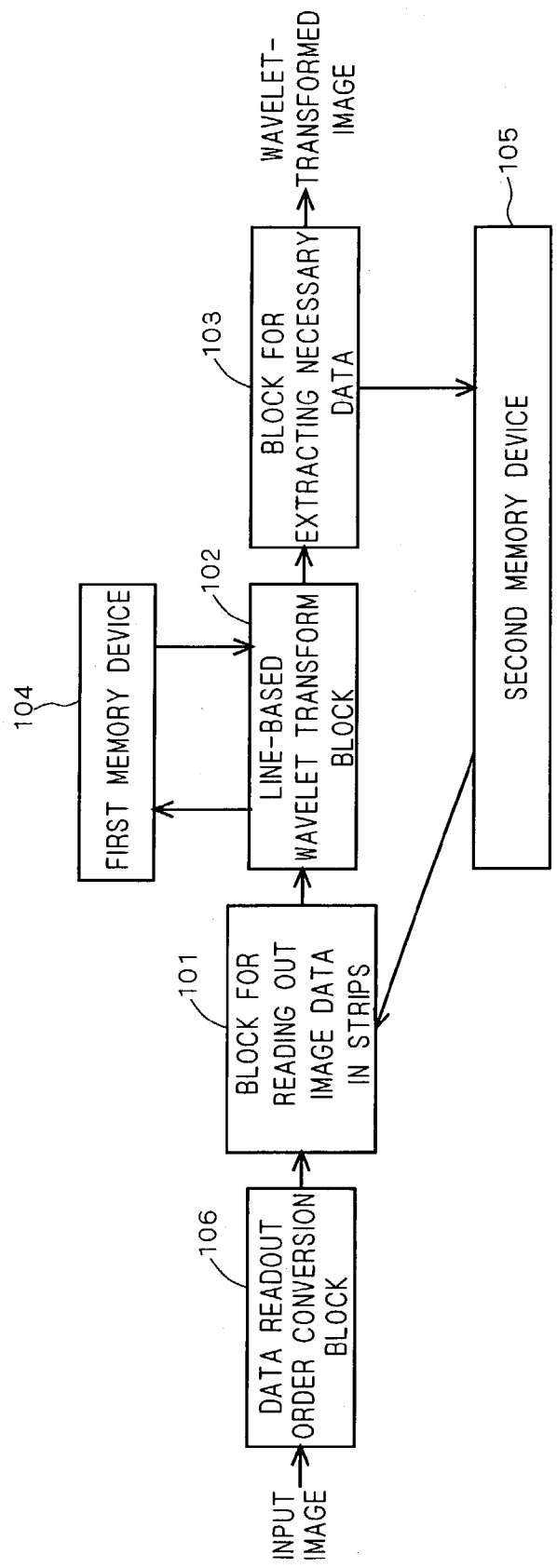
FIG. 24 is a block diagram showing a wavelet processing apparatus according to the fourth embodiment of the present invention.
Figure 25:
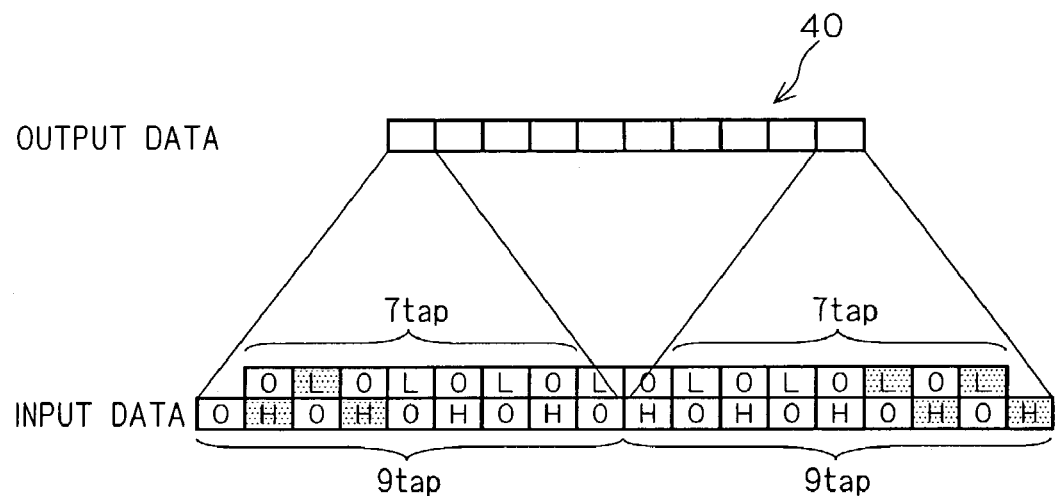
FIG. 25 shows an operation example of 9×7 filtering in a general line-based reverse wavelet transform.
Figure 26:
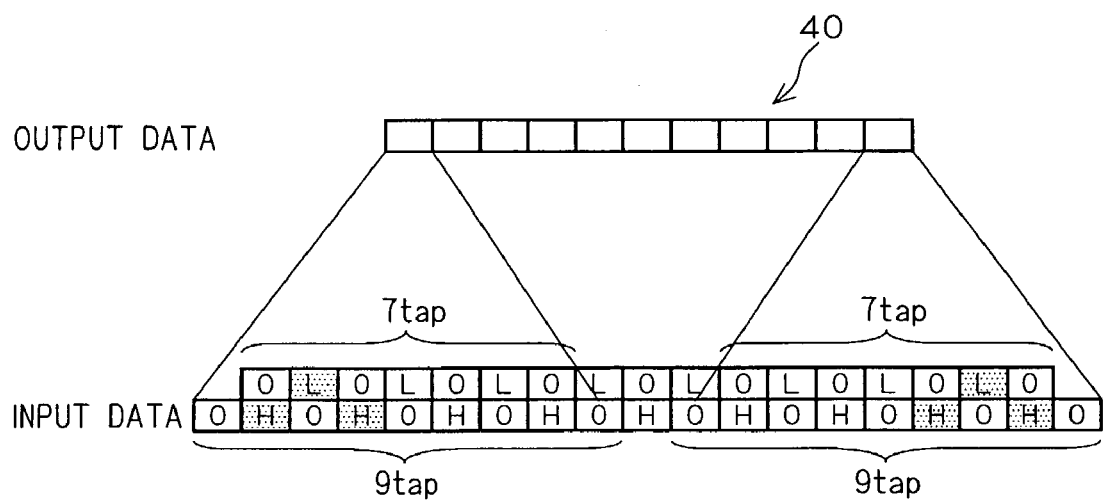
FIG. 26 shows an operation example of the 9×7 filtering in the general line-based reverse wavelet transform.
Figure 27:
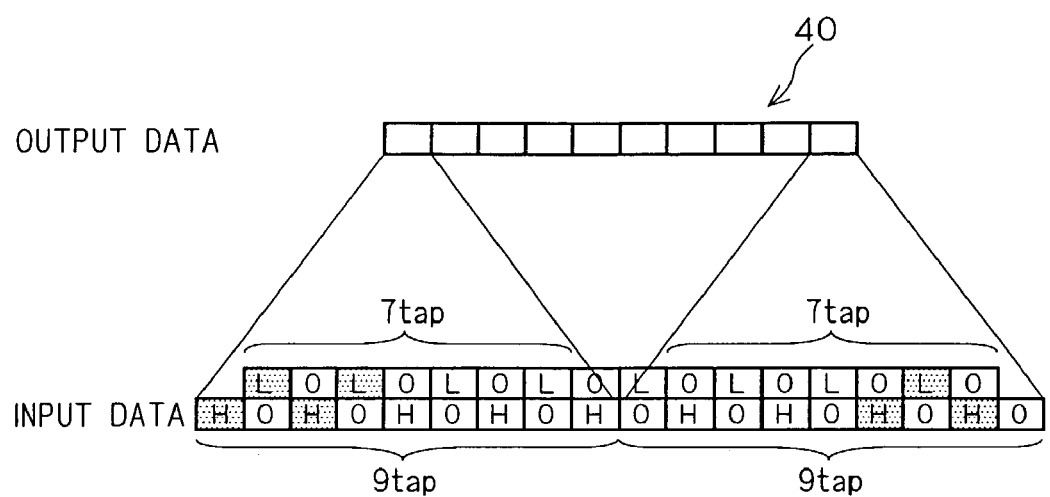
FIG. 27 shows an operation example of the 9×7 filtering in the general line-based reverse wavelet transform.

As an arrangement for realizing such a process, a wavelet processing apparatus shown in FIG. 24 is used. Herein, a data readout order conversion block 106 for converting the data readout order of input image is added with respect to the wavelet processing apparatus shown in FIG. 16.

By arranging in this manner, it is possible to process the original image sequentially from the upper end to the lower end, so that the wavelet transform can be comfortably executed on the original image.

In this case, processes that follow the mirror reverse and counterclockwise (left) turning by 90 degrees of the original image, can be executed in the same manner as the wavelet transform in the first embodiment (see FIG. 1) described above. As a result of this, it is possible to obtain a similar effect to that of the first embodiment.

Principle 1 of Synthesis Side

In the above, the description has been given of the process of the wavelet transform, and now a wavelet transform process on the synthesis side for expanding compression data obtained in the above wavelet transform will be described.

FIGS. 25 to 28 show a region when compression data that has been subjected to wavelet transform by means of the 9×7 filter, is excessively read out at the synthesis by way of a non-tiling process. FIGS. 29 to 32 show a region when compression data that has been subjected to wavelet transform by means of the 5×3 filter, is excessively readout at the synthesis by way of a non-tiling process.

Figure 28:
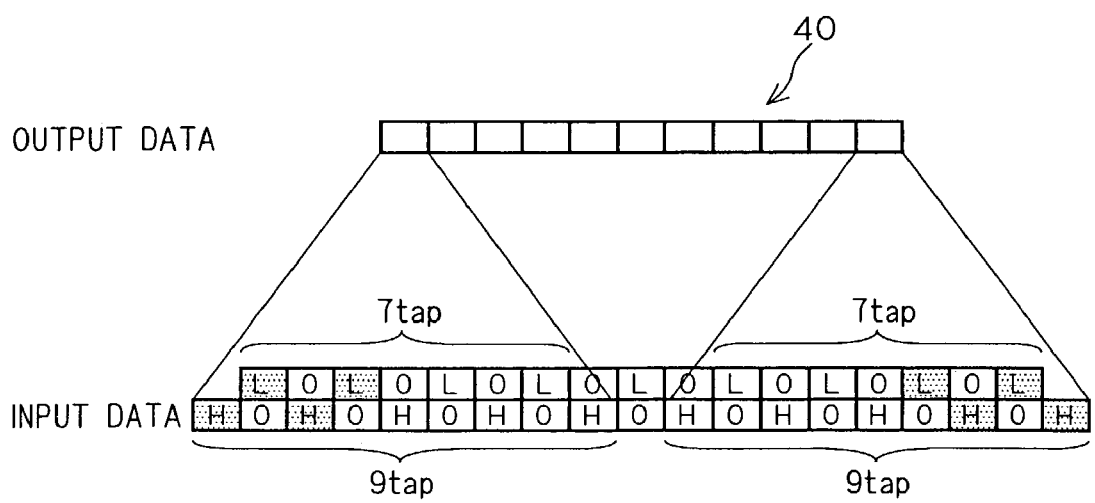
FIG. 28 shows an operation example of the 9×7 filtering in the general line-based reverse wavelet transform.
Figure 29:
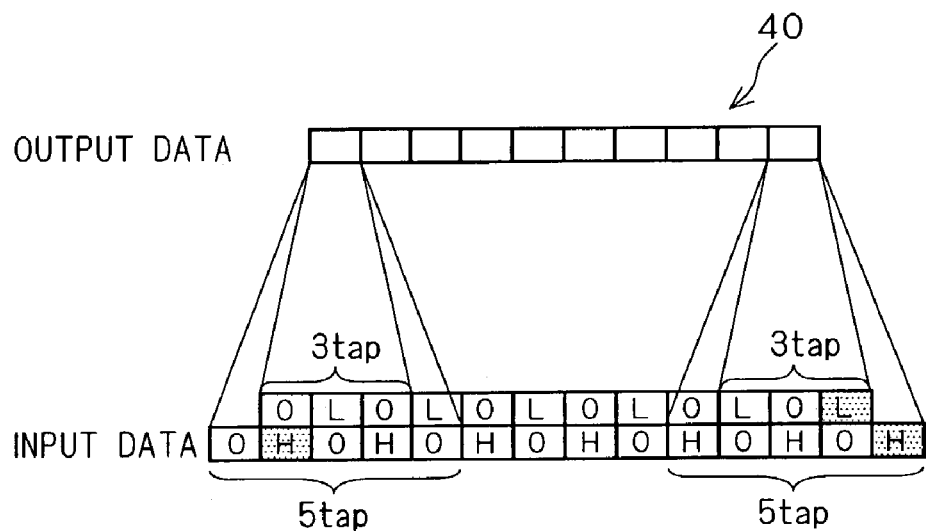
FIG. 29 shows an operation example of 5×3 filtering in the general line-based reverse wavelet transform.
Figure 30:
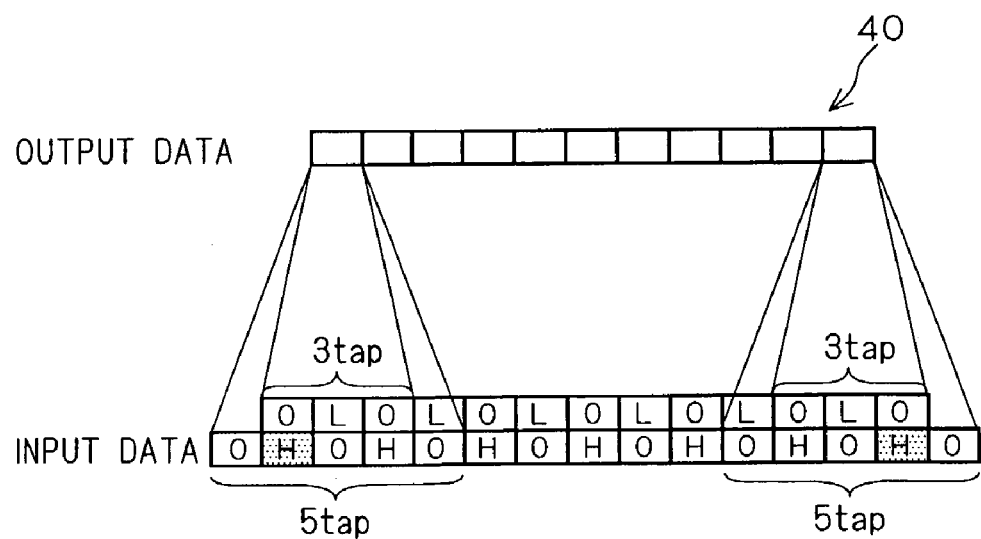
FIG. 30 shows an operation example of the 5×3 filtering in the general line-based reverse wavelet transform.
Figure 31:
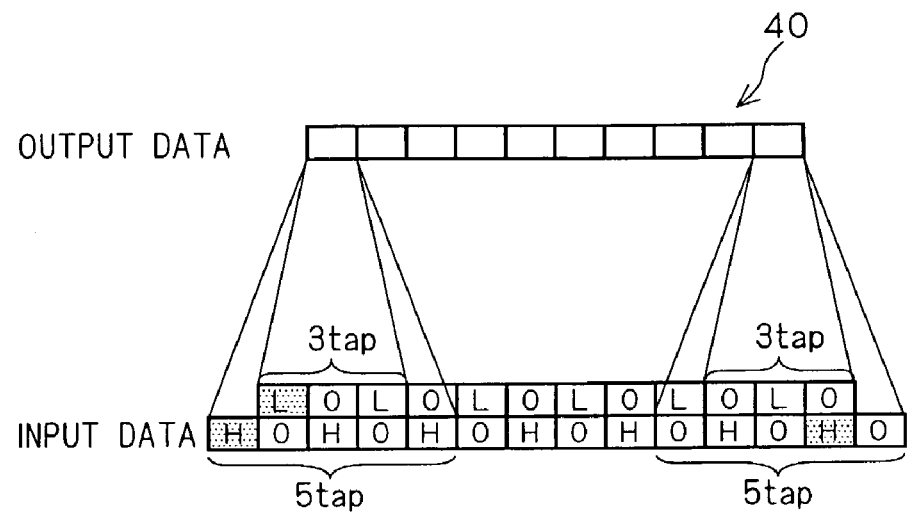
Figure 32:
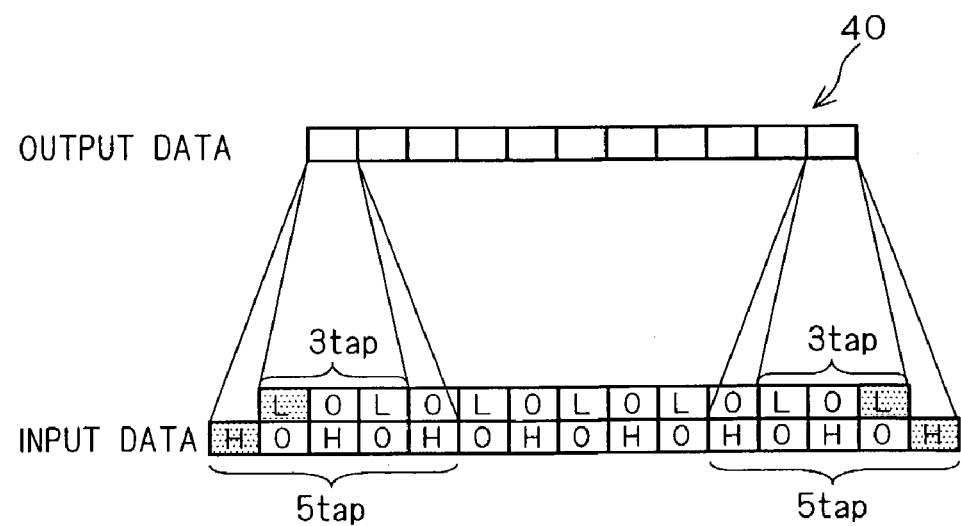
FIG. 32 shows an operation example of the 5×3 filtering in the general line-based reverse wavelet transform.

The wavelet processing method (reverse wavelet transforming method) at the synthesis side of the present invention also adopts the approach which is similar to that of the decomposition side. That is, depending on the data number (even number or odd number) in each decomposition level, and the data starting point (even-numbered or odd-numbered), as shown in FIGS. 25 to 28 for the 9×7 filter and as shown in FIGS. 29 to 32 for the 5×3 filter, there are four patterns respectively: a case where the notice data column (output data) 40 starts at even-numbered data (low-pass data L) and the number of data is even (FIGS. 25 and 29); a case where the notice data column 40 starts at even-numbered data (low-pass data L) and the number of data is odd (FIGS. 26 and 30); a case where the notice data column 40 starts at odd-number data (high-pass data H) and the number of data is even (FIGS. 27 and 31); and a case where the notice data column 40 starts at odd-numbered data (high-pass data H) and the number of data is odd (FIGS. 28 and 32). It is noted that at the synthesis side, in the 9×7 filter, data of 7Tap for low-pass data L and 9Tap for high-pass data H is required, while in the 5×3 filter, data of 3Tap for low-pass data L and 5Tap for high-pass data H is required.

When it is designed to support reading out of four patterns of data as described above, the circuit for executing input control of reverse wavelet transform will be very complicated. For this reason, the following rules (3) and (4) are provided in the same manner as the decomposition side.

(3) Data should start at even-numbered data and the number of data should be exclusively even.

(4) Data to be excessively read out in low-pass data L is focused.

Figure 33:
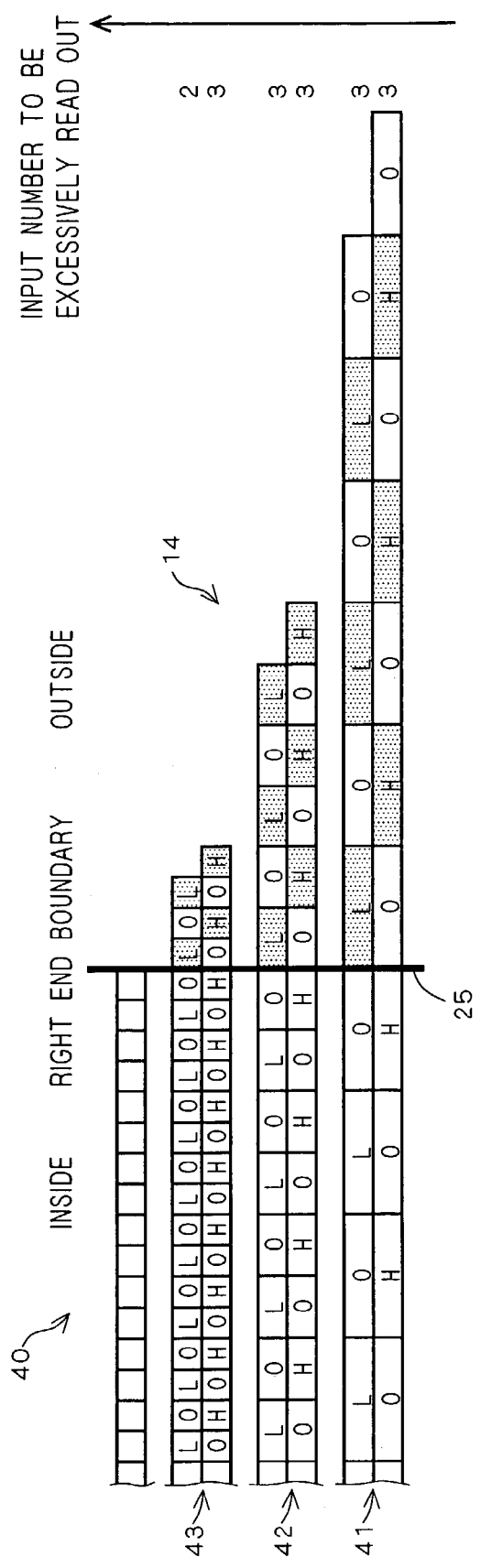
FIG. 33 shows excess data to be read out at a trailing end position of a notice data column on a synthesis side when a 9×7 filter is used.
Figure 34:
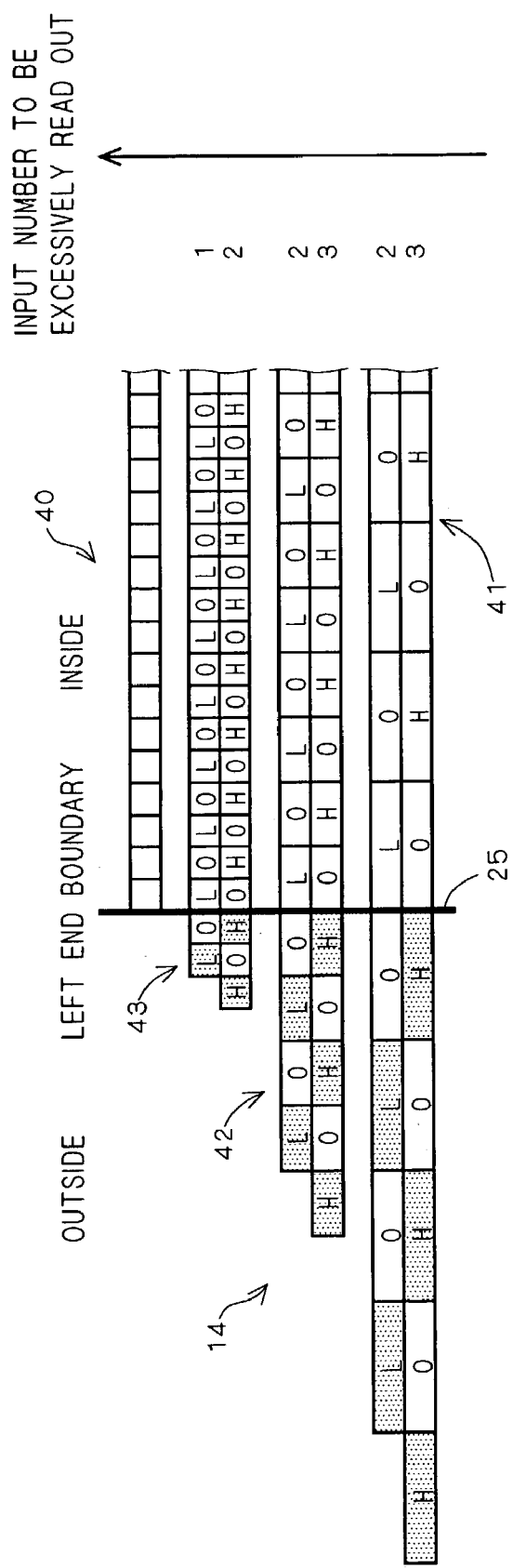
FIG. 34 shows excess data to be read out at a leading end position of the notice data column on the synthesis side when the 9×7 filter is used.

FIG. 33 shows excess data 14 which should be read out at the trailing position of the notice data column 40 in the synthesis side when the 9×7 filter is used, and FIG. 34 shows excess data 14 which should be read out at the leading position of the same. In the 9×7 filter, since the synthesis is executed in Tap numbers as described above, at the trailing position shown in FIG. 33, three sets of low-pass data L and three sets of high-pass data H are read out at the third stage 41, three sets of low-pass data L and three sets of high-pass data H are read out at the second stage 42, and two sets of low-pass data L and two sets of high-pass data H are read out at the first stage 43 to synthesize the trailing data of the notice data column 40. Also in the leading position shown in FIG. 34, for the same reason as described above, two sets of low-pass data L and three sets of high-pass data H are read out at the third stage 41, two sets of low-pass data L and three sets of high-pass data H are read out at the second stage 42, and one set of low-pass data L and two sets of high-pass data H are read out at the first stage 43 to synthesize the leading data of the notice data column 40. In summary, the data number (data number to be excessively read out) of the excess data 14 are as shown in Table 5 depending on the decomposition number (WT number) at which band decomposition was made. In Table 5, "left end" and "right end" respectively represent data numbers of excess data 14 to be required in synthesizing the leading data and the trailing data, "LOW" represents a number or required low-pass data L, and "HIGH" represents a number of required high-pass data H.

TABLE 5

| | Data number to be excessively read | | | |
| --- | --- | --- | --- | --- |
| | Left end | | Right end | |
| WT number | LOW | HIGH | LOW | HIGH |
| 1 | 1 | 2 | 2 | 2 |
| 2 | 2 | 3 | 3 | 3 |
| 3 | 2 | 3 | 3 | 3 |
| 4 | 2 | 3 | 3 | 3 |
| 5 | 2 | 3 | 3 | 3 |
| 6 | 2 | 3 | 3 | 3 |
| 7 | 2 | 3 | 3 | 3 |
| 8 | 2 | 3 | 3 | 3 |
| 9 | 2 | 3 | 3 | 3 |
| 10 | 2 | 3 | 3 | 3 |

Figure 35:
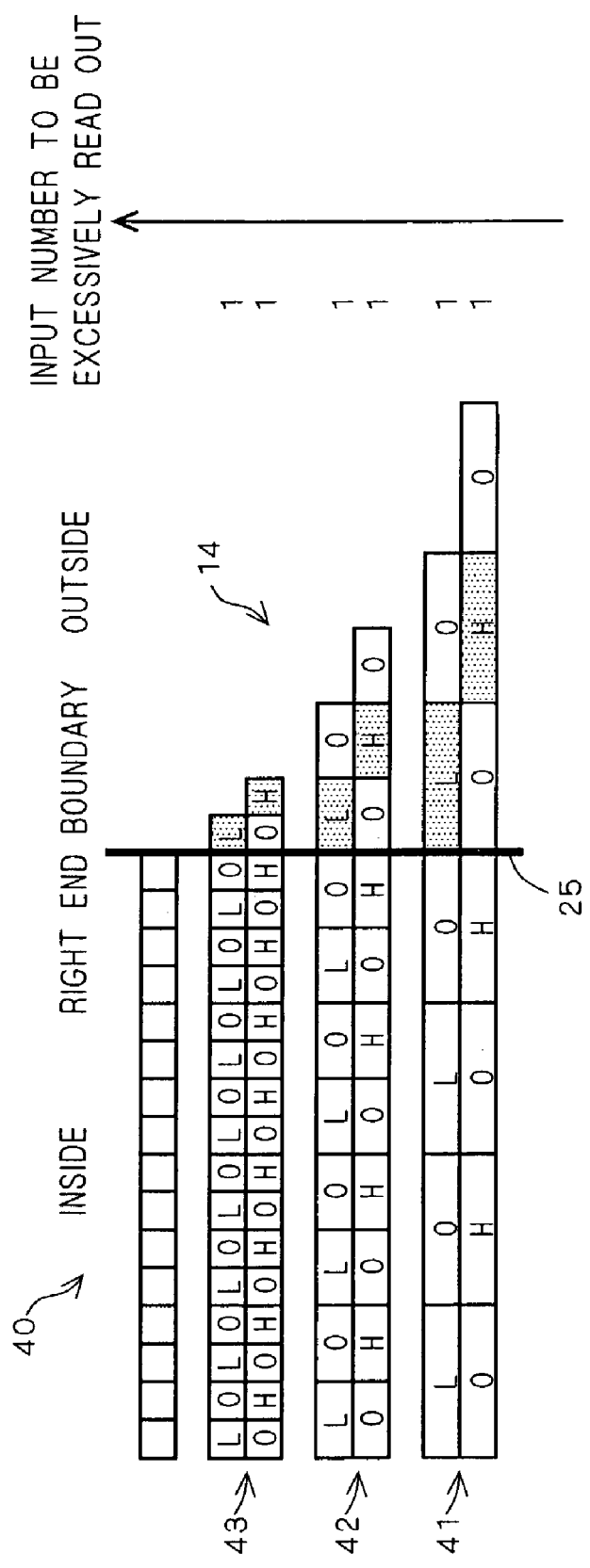
FIG. 35 shows excess data to be read out at the trailing end position of the notice data column on the synthesis side when a 5×3 filter is used.
Figure 36:
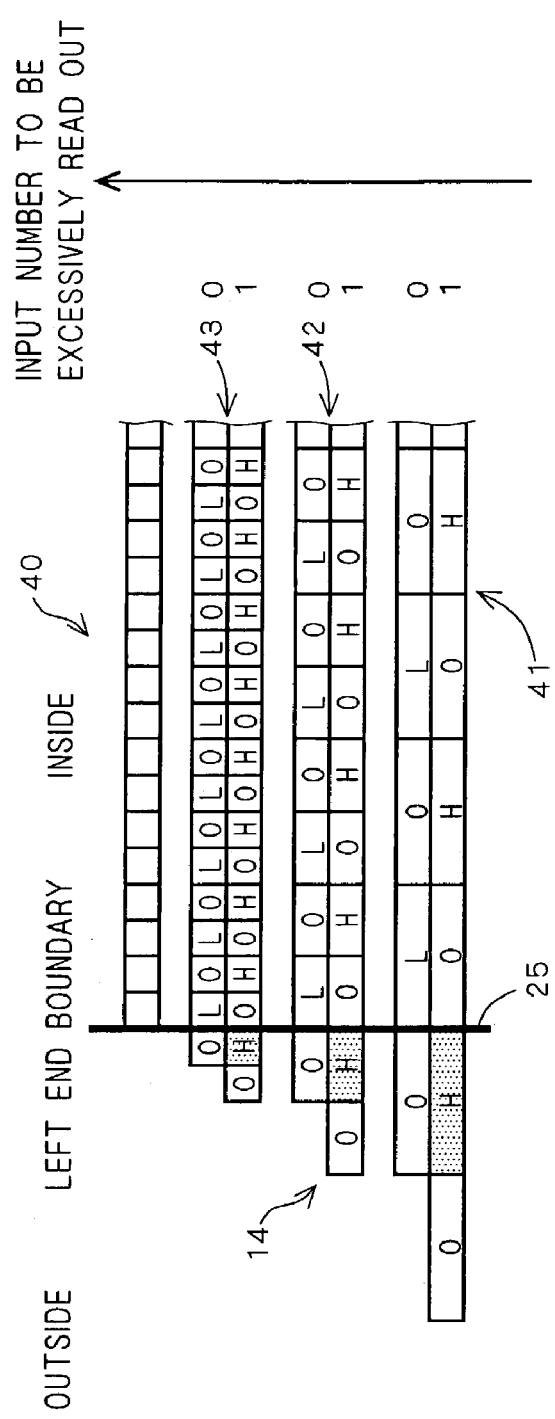
FIG. 36 shows excess data to be read out at the leading end position of the notice data column on the synthesis side when the 5×3 filter is used.

Also in the 5×3 filter, as is the same with the above, FIG. 35 shows excess data 14 which should be read out at the trailing position of the notice data column 40 in the synthesis side, and FIG. 36 shows excess data 14 which should read out at the leading position of the same. In 5×3 filter, at the trailing position shown in FIG. 35, one set of low-pass data L and 1 set of high-pass data H are read out at the third stage 41, one set of low-pass data L and one set of high-pass data H are read out at the second stage 42, and one set of low-pass data L and one set of high-pass data H are read out at the first stage 43 to synthesize the trailing data of the notice data column 40. Also in the leading position shown in FIG. 36, for the same reason as described above, zero set of low-pass data L and one set of high-pass data H are read out at the third stage 41, zero set of low-pass data L and one set of high-pass data H are read out at the second stage 42, and zero set of low-pass data L and one set of high-pass data H are read out at the first stage 43 to synthesize the leading data of the notice data column 40. In summary, the data number (data number to be excessively read out) of the excess data 14 are as shown in Table 6 depending on the decomposition number (WT number) at which band decomposition was made.

TABLE 6

| | Data number to be excessively read | | | |
|---|---|---|---|---|
| | Left end | | Right end | |
| WT number | LOW | HIGH | LOW | HIGH |
| 1 | 0 | 1 | 1 | 1 |
| 2 | 0 | 1 | 1 | 1 |
| 3 | 0 | 1 | 1 | 1 |
| 4 | 0 | 1 | 1 | 1 |
| 5 | 0 | 1 | 1 | 1 |
| 6 | 0 | 1 | 1 | 1 |
| 7 | 0 | 1 | 1 | 1 |
| 8 | 0 | 1 | 1 | 1 |
| 9 | 0 | 1 | 1 | 1 |
| 10 | 0 | 1 | 1 | 1 |

In the 9×7 filter, as shown in FIGS. 33, 34 and Table 5, since the data number of the excess data 14 at the synthesis side is not as many as that of the decomposition side, the data can be excessively read out at both ends. Also in the 5×3 filter, as shown in FIGS. 35, 36 and Table 6, since the data number of the excess data 14 at the synthesis side is not as many as that of the decomposition side, the data can be excessively read out at both ends.

In this case, the length of the longest line memory is sufficient if it has such a memory capacity that has factors of two to powers as much as possible and an additional length for excessive reading. As a result, the memory capacity of the line memory can be saved.

Fifth Embodiment

Figure 37:
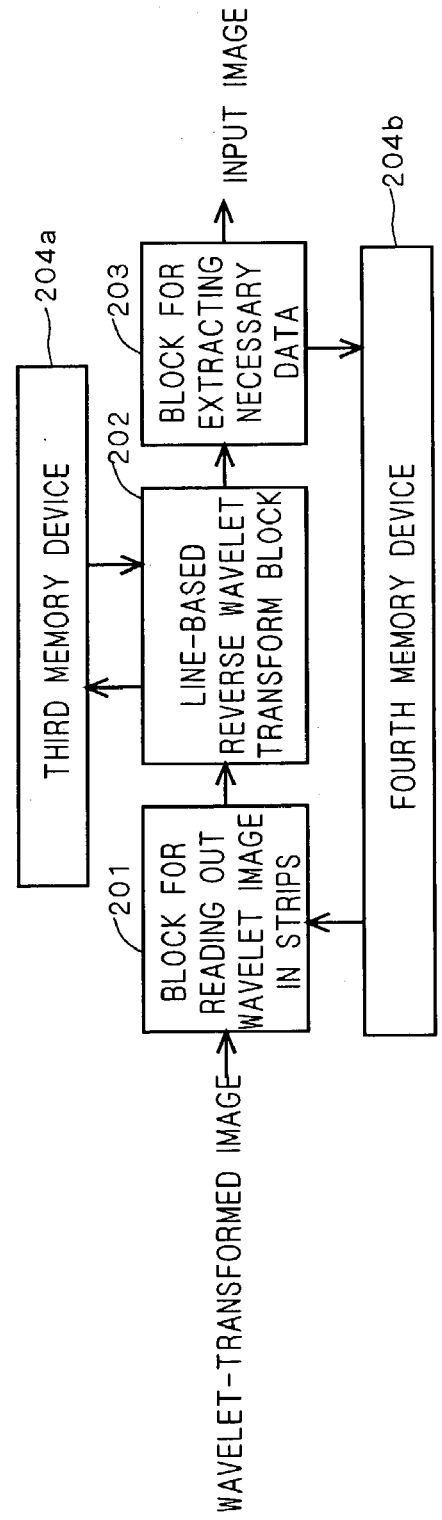
FIG. 37 is a block diagram showing a wavelet processing apparatus according to a fifth embodiment of the present invention.
Figure 38:
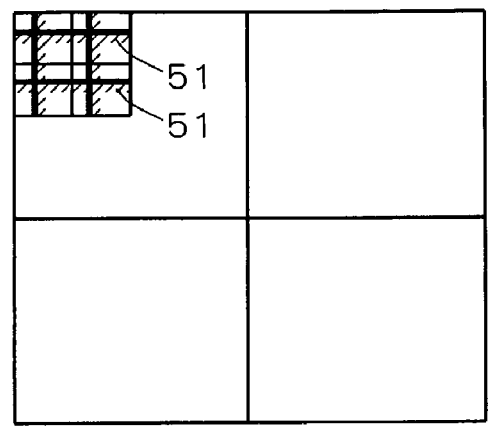
FIG. 38 shows excess data at a third decomposition level when band synthesis is executed for each block region.
Figure 39:
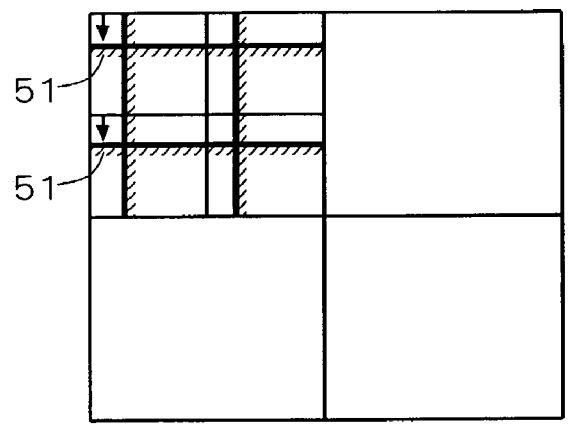
FIG. 39 shows excess data at a second decomposition level when the band synthesis is executed for each block region.
Figure 40:
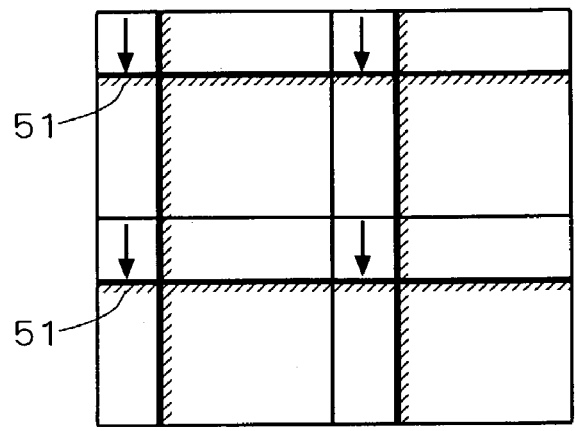
FIG. 40 shows excess data at a first decomposition level when the band synthesis is executed for each block region.
Figure 41:
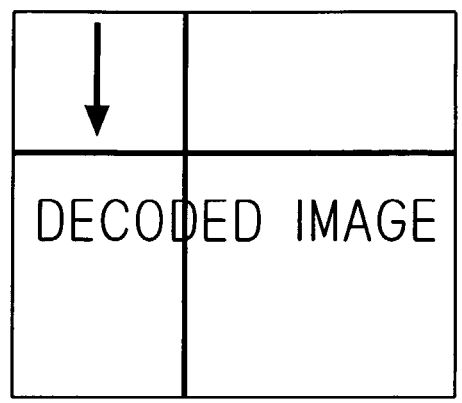
FIG. 41 shows a decoded image which is band-synthesized for each block region.
Figure 42:
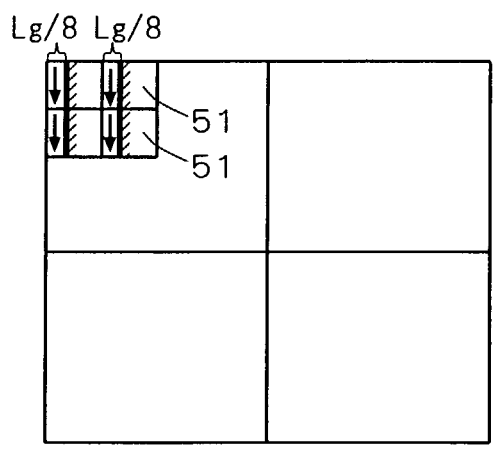
FIG. 42 shows excess data of a third decomposition level when band synthesis is executed for each strip region in a wavelet processing method according to the fifth embodiment of the present invention.
Figure 43:
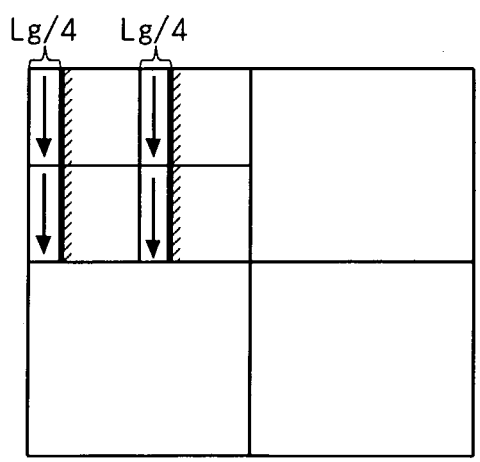
FIG. 43 shows excess data of a second decomposition level when the band synthesis is executed for each strip region in the wavelet processing method according to the fifth embodiment of the present invention.
Figure 44:
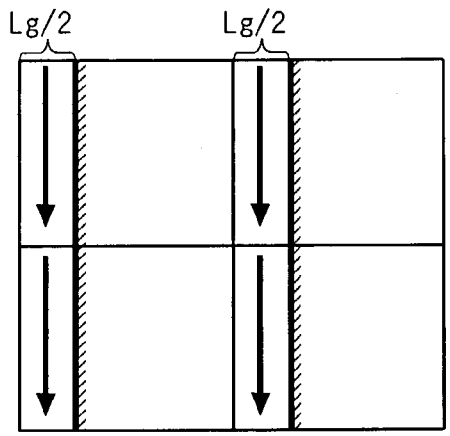
FIG. 44 shows excess data of a first decomposition level when the band synthesis is executed for each strip region in the wavelet processing method according to the fifth embodiment of the present invention.
Figure 45:
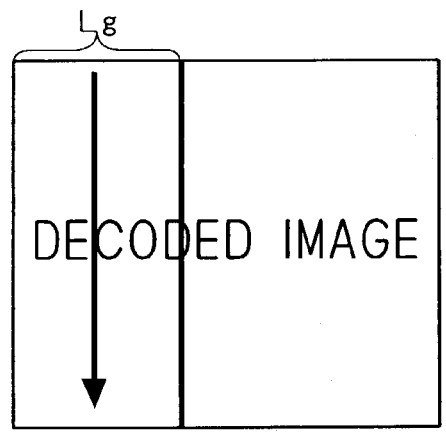
FIG. 45 shows a decoded image which is band-synthesized for each strip region in the wavelet processing method according to the fifth embodiment of the present invention.

In a fifth embodiment of the present invention, a wavelet processing apparatus shown in FIG. 37 is used. This wavelet processing apparatus includes: a readout block 201 for reading out data in strip shape from a compression image having subjected to the wavelet transform on the decomposition side; a block (line-based reverse wavelet transform block) 202 for performing a line-based reverse wavelet transform of the data read out at this readout block 201; a block (data extraction block) 203 for extracting necessary from the line-based reverse wavelet transform block 202; a third memory device 204a corresponding a line memory for temporarily storing data in performing the wavelet transform at the line-based reverse wavelet transform block 202; and a fourth memory device (large capacity memory device) 204b corresponding to a main memory for storing data in order to repeatedly and recursively perform reverse wavelet transform on output results from the data extraction block 203.

Figure 46:
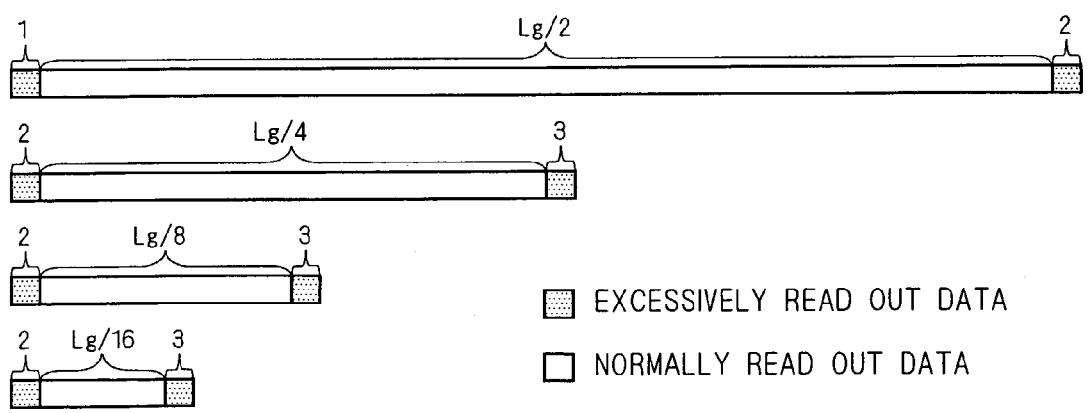
FIG. 46 shows excess data required for low-pass data in the wavelet processing method according to the fifth embodiment of the present invention.
Figure 47:
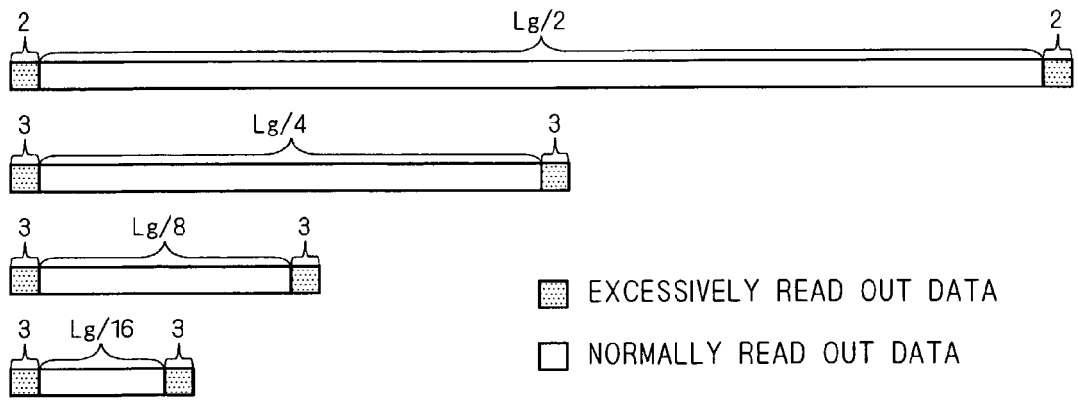
FIG. 47 shows excess data required for high-pass data in the wavelet processing method according to the fifth embodiment of the present invention.

FIG. 38 to FIG. 41 sequentially show the processing procedure in a case of performing a reverse wavelet transform using the above-described wavelet processing apparatus while handling the data in block shape. A reference numeral 51 in FIGS. 38 to 41 means excess data to be read in the vertical direction. When the data is handled in block shape to perform the reverse wavelet transform, it is necessary to read out excess data 51 so as to overlap also in the vertical direction, and hence overhead of the memory access increases. In view of this, as shown in FIGS. 42 to 45, it is so configured that data is read out in each sequential decomposition level in strip shape. As shown in FIG. 46 and FIG. 47, in performing a line-based wavelet, the data number of excess data 14 of the 9×7 filter is (2, 3, 3 . . . ) at the right end of the low-pass (FIG. 46) and (1, 2, 2 . . . ) at the left end of the low-pass (FIG. 46), and (2, 3, 3 . . . ) at the right end of the high-pass (FIG. 47) and (2, 3, 3 . . . ) at the left end of the high-pass (FIG. 47) from Table 5. Likewise, the data number excessively read out by the 5×3 filter is, as seen from Table 6, (1, 1, 1 . . . ) at the right end of the low-pass and (0, 0, 0 . . . ) at the left end of the low-pass, and (1, 1, 1 . . . ) at the right end of the high-pass and (1, 1, 1 . . . ) at the left end of the high-pass from Table 6. That is, there is no data to be excessively read at the left end of the low-pass of the 5×3 filter.

By processing in the manner as described above, it is possible to synthesize an image using extremely few excess data 14. In particular, since it is not necessary to read out excess data 51 in the vertical direction, overhead of memory access is reduced, and hence synthesizing process (reverse wavelet transform) can be performed with high efficiency.

Figure 48:
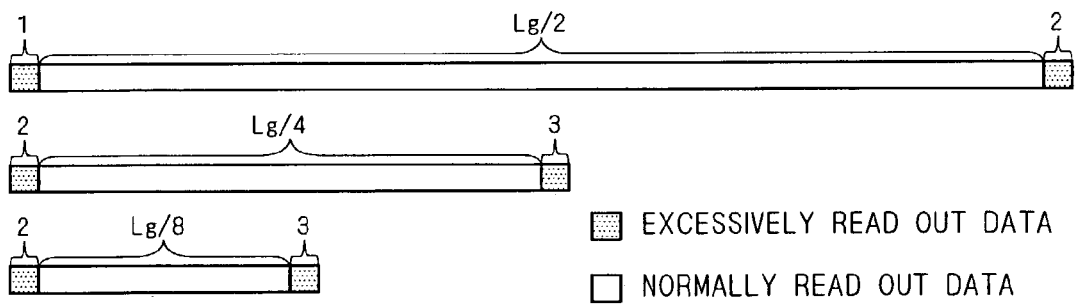
FIG. 48 shows excess data required for low-pass data when the number of decomposition levels is three in the wavelet processing method according to the fifth embodiment of the present invention.
Figure 49:
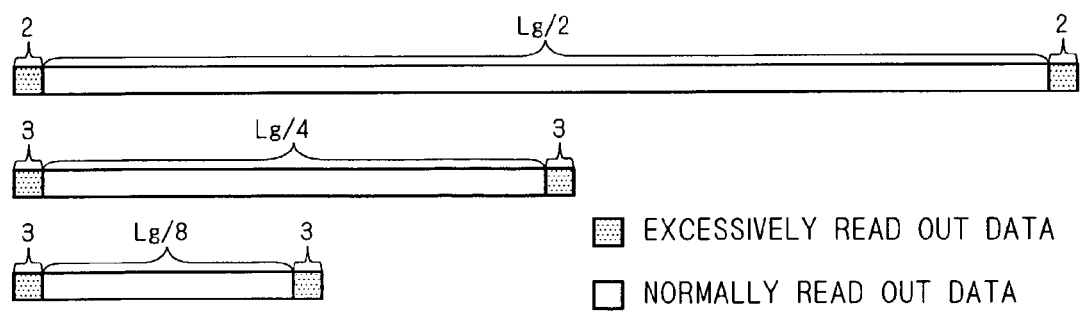
FIG. 49 shows excess data required for high-pass data when the number of decomposition levels is three in the wavelet processing method according to the fifth embodiment of the present invention.

Also in this embodiment, by using a line memory by which reverse wavelet transform of small number of decomposition levels is possible, and using the line memory repeatedly and recursively, multi-level reverse wavelet transform can be achieved with a small line memory. For example, the case where a reverse wavelet transform is performed with respect to the data that has been subjected to the wavelet transform using the 9×7 filter using only a line memory required for three-decomposition levels (WT number) will now be considered. In this case, for example, the reverse wavelet transform at the low-pass side shown in FIG. 48 and the reverse wavelet transform at the high-pass side shown in FIG. 49 are executed to excessively read out low-pass data L and high-pass data H as excess data 14, respectively. The data number of the excess data 14 at this time is as indicated in the row of the WT number=3 in Table 5.

FIGS. 50A to 50C show an operation of the reverse wavelet transform when the number of decomposition levels in the synthesis using the 9×7 filter is three. FIG. 50A shows the result of band synthesis of the third decomposition level, FIG. 50B shows the result of band synthesis of the second decomposition level, and FIG. 50C shows the result of the first decomposition level. In this way, by collectively performing the reverse wavelet transform for the three-decomposition levels, and using the line memory shown in FIGS. 48 and 49 recursively for the synthesis of the next three-decomposition levels, the reverse wavelet transform of deeper decomposition levels is performed. In this case, the decomposition levels of three is merely an example.

Though not shown, also in the case of the 5×3 filter, the similar principle applies to execute the reverse wavelet transform.

According to the above, by only using the line memory of small memory capacity and making an ingenious plan in the processing procedure, it is possible to execute the reverse wavelet transform of deeper decomposition level without causing any problems.

Sixth Embodiment

When the Precinct39 is decoded in the raster scanning order as shown in 21, the reverse wavelet transform in strip cannot be executed until the EBCOT decoding of one screen has completed. However, as shown in FIGS. 42 to 45, by decomposing in blocks to allow generation of the excess data 51 in the vertical direction, it is possible to start the reverse wavelet transform at the time when the EBCOT decoding of the portion corresponding to the precinct39 is finished.

Figure 51:
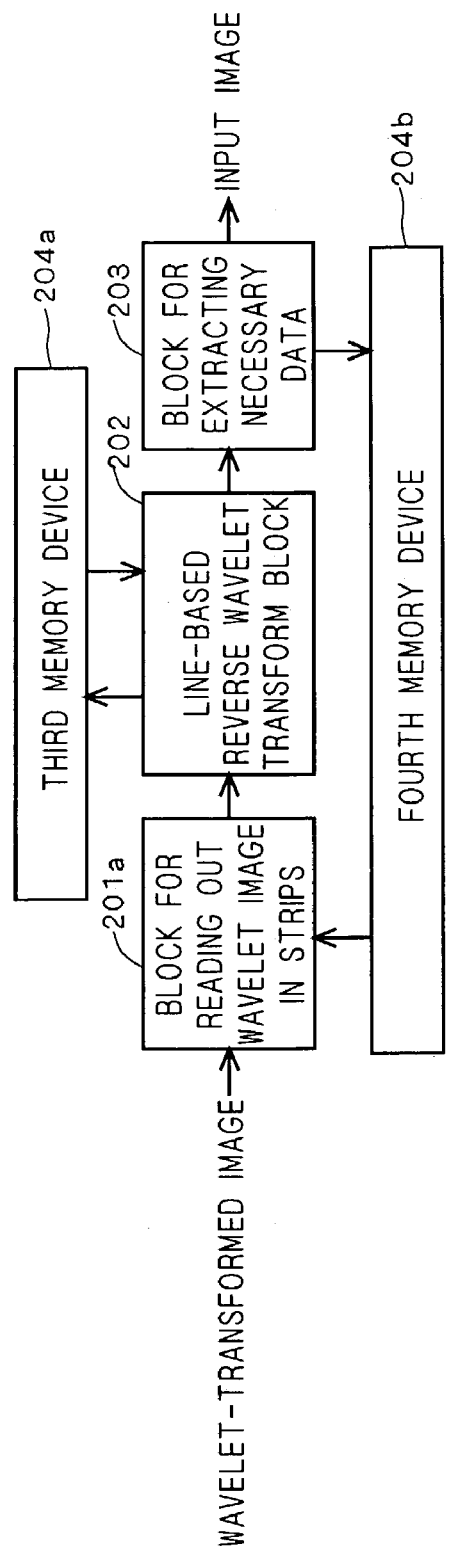
FIG. 51 is a block diagram showing a wavelet processing apparatus according to a sixth embodiment of the present invention.

As an arrangement that realizes such a process, a wavelet processing apparatus shown in FIG. 51 is used. In this apparatus, in place of the readout block 201 of the wavelet processing apparatus shown in the FIG. 37, a readout block 201a for reading out data in block from a compression image can be employed.

This case corresponds to the case of blocking process when left is read as top and right is read as bottom. This is useful in the situation that the data is required to be displayed as soon as possible when the data transfer speed is low via a network or the like.

Seventh Embodiment

Figure 52:
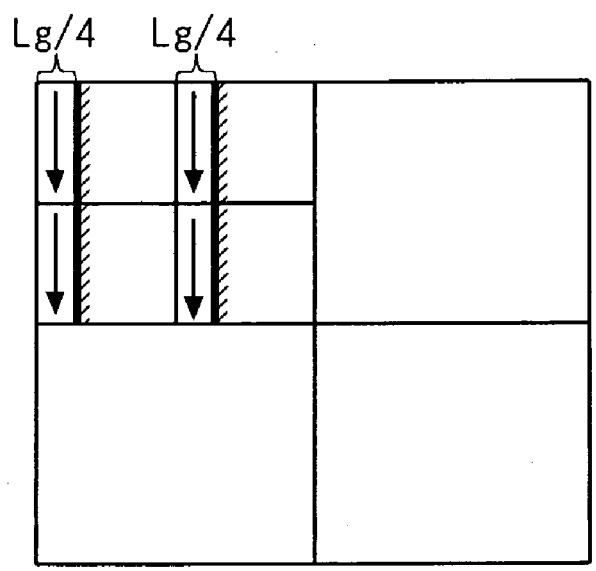
FIG. 52 shows a wavelet processing method according to a seventh embodiment of the present invention.
Figure 53:
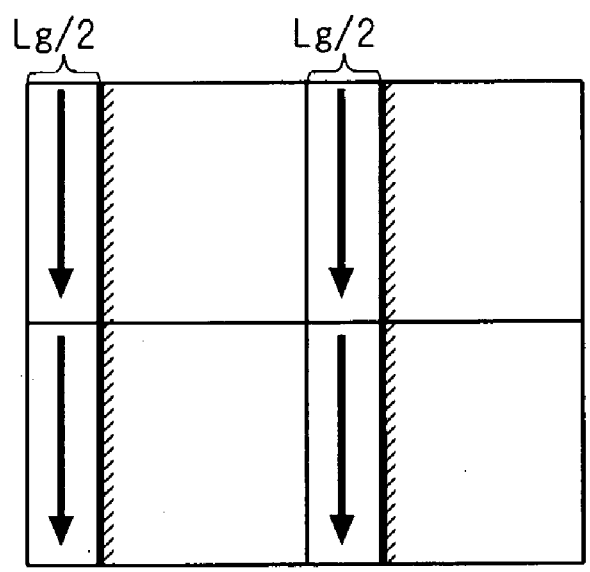
FIG. 53 shows the wavelet processing method according to the seventh embodiment of the present invention.
Figure 54:
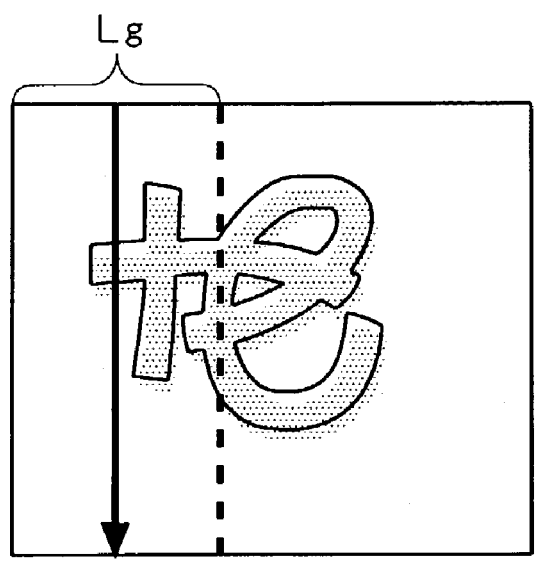
FIG. 54 shows the wavelet processing method according to the seventh embodiment of the present invention.
Figure 55:
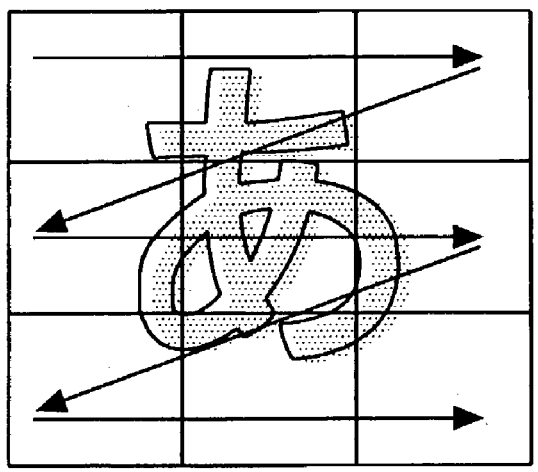
FIG. 55 shows the wavelet processing method according to the seventh embodiment of the present invention.

In the case where the image obtained by mirror reversing the original image and turning left by 90 decrees as shown in FIG. 23 is to be scanned at a stroke for each strip region 12 in the vertical direction to decode the encoded object in the raster scanning order by the Precinct, the object that has been decoded in the procedure as shown in FIGS. 52 to 54 and the fifth embodiment (that is, sequentially decoding order as shown in FIGS. 52 to 54) can be finally turned right by 90 degrees in FIG. 55 and mirror-reversed for obtaining a synthesis image corresponding to the original image. In this manner, even when the strip region 12 is scanned for the purpose of preventing occurrence of the excess data 51 in the vertical direction, it is possible to correctly perform reverse wavelet transform process on the Precinct in the raster scanning order.

Figure 56:
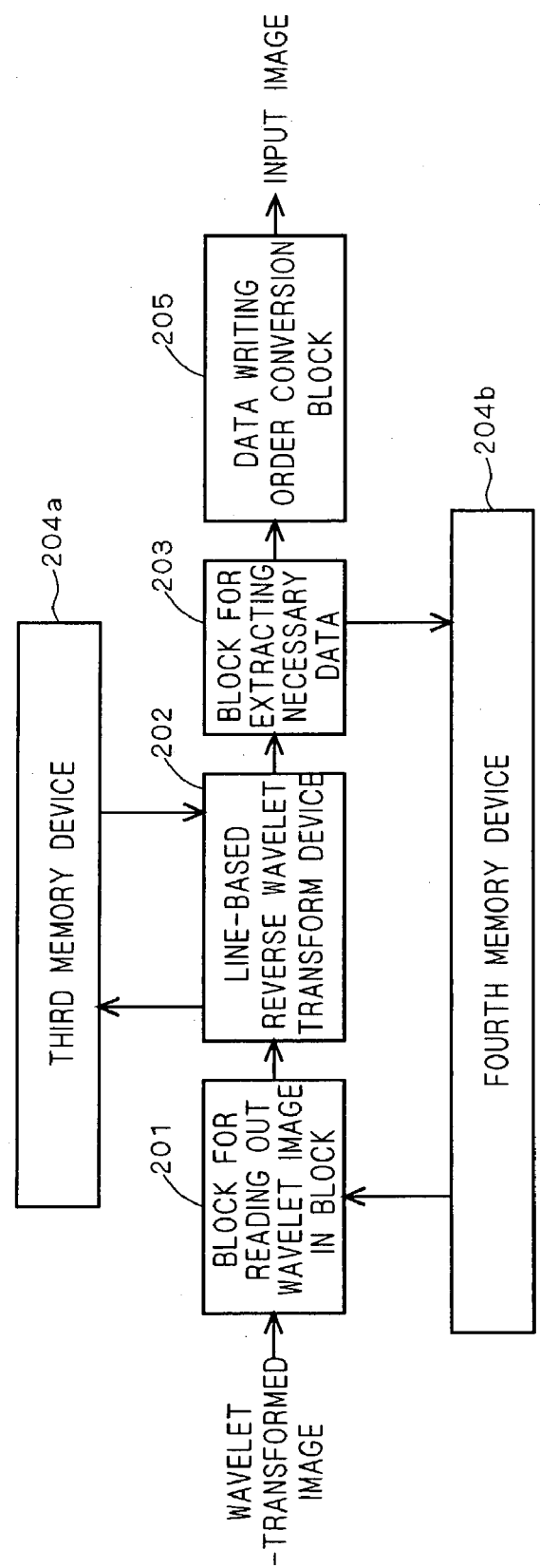
FIG. 56 is a block diagram showing a wavelet processing apparatus according to the seventh embodiment of the present invention.
Figure 57:
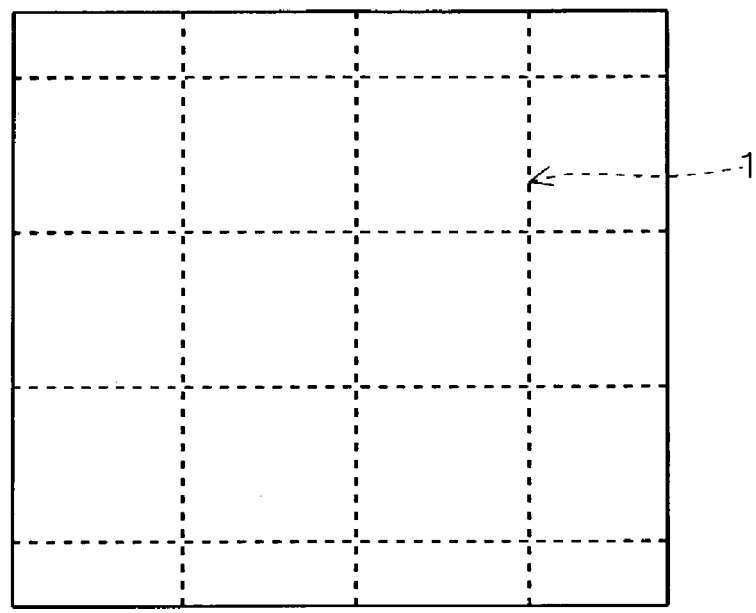
FIG. 57 shows a state of tiling an image in a conventional manner.
Figure 58:
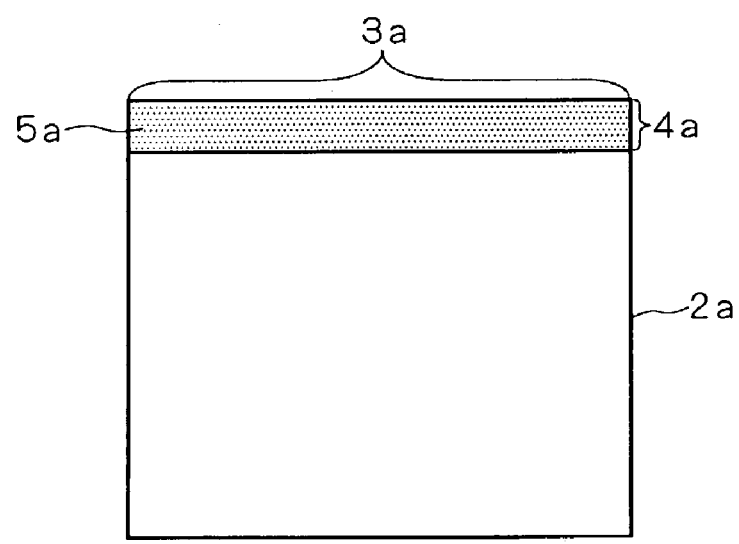
FIG. 58 shows a conventional wavelet processing method.
Figure 59:
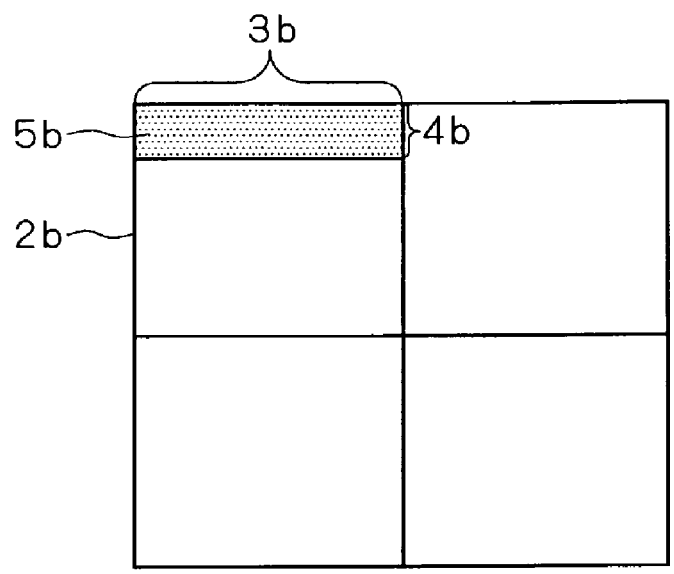
FIG. 59 shows the conventional wavelet processing method.
Figure 60:
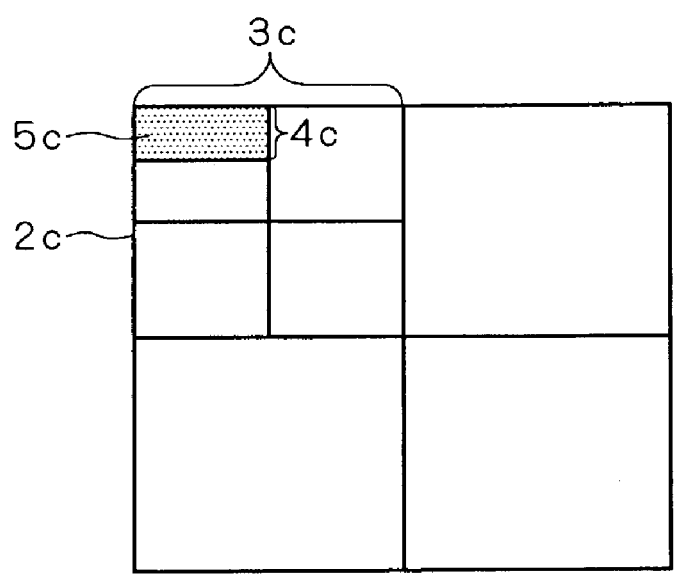
FIG. 60 shows the conventional wavelet processing method.

As an arrangement for realizing such a process, a wavelet processing apparatus shown in FIG. 56 is used. In this case, with respect to the wavelet processing apparatus shown in FIG. 37, a writing order conversion block 205 for turning right by 90 degrees and mirror reversing the writing order of data as shown in FIG. 55 may be added.

In the above described method according to the principle 1 of the synthesis side, it is possible to prevent an image distortion on the boundary using a line memory of small capacity. However, it is necessary to process data outside the boundary on both of the right and left sides. In consideration of this, description will be given of principle 2 of the synthesis side and its working example wherein the similar effect can be obtained with a simple process though a capacity of line memory to be used becomes larger compared to the principle 1 of the synthesis side.

Principle 2 of Synthesis Side

In this method, in place of the limitation (4) described in the principle 2 of the synthesis side, the following limitation (5) is provided for executing the process.

(5) Data is excessively read out only on the left side and data outside the boundary is not used on the right side.

Figure 61:
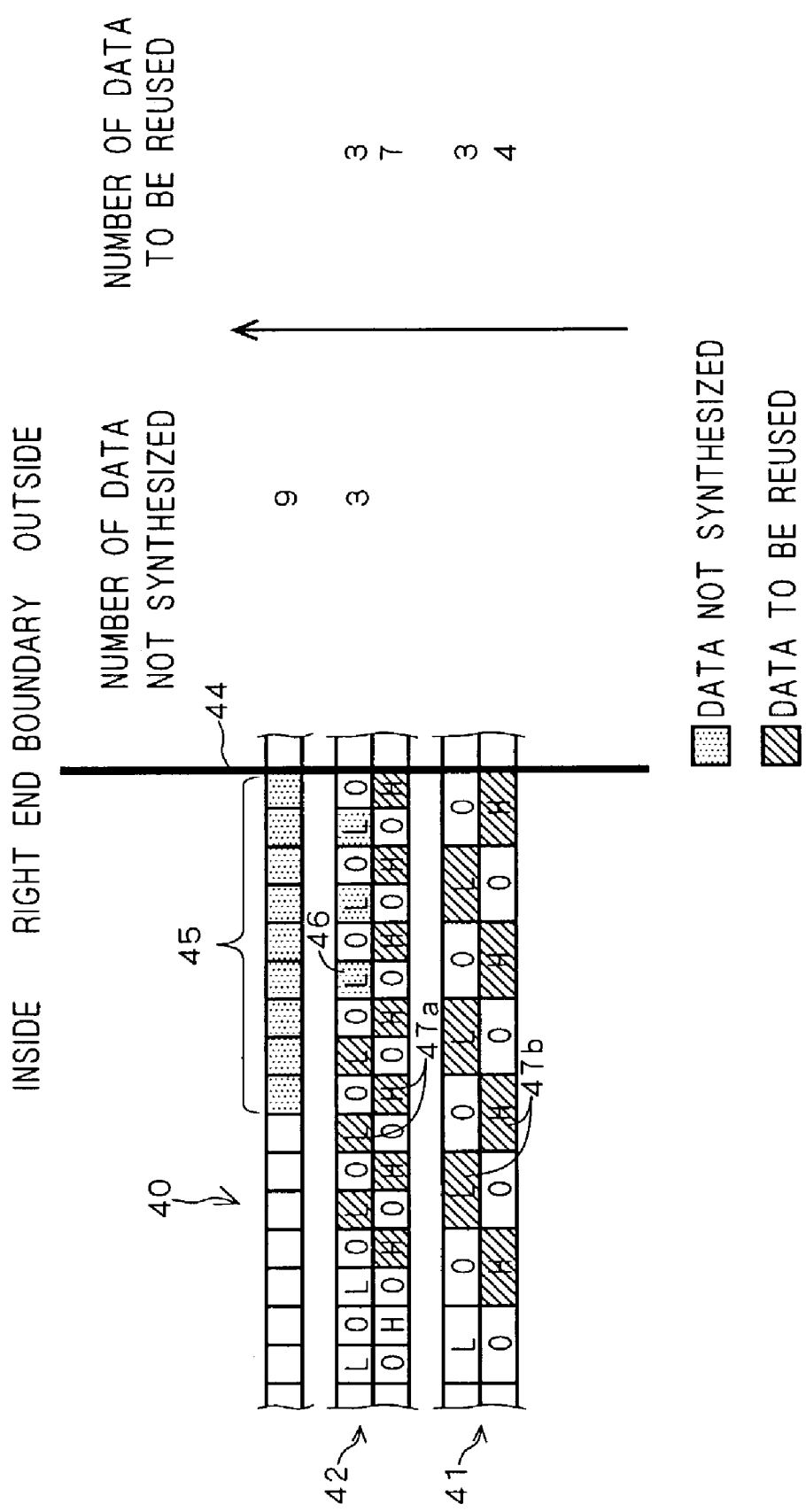
FIG. 61 shows excess data to be read out at a trailing end position of a notice data column on a synthesis side when a 9×7 filter is used.
Figure 62:
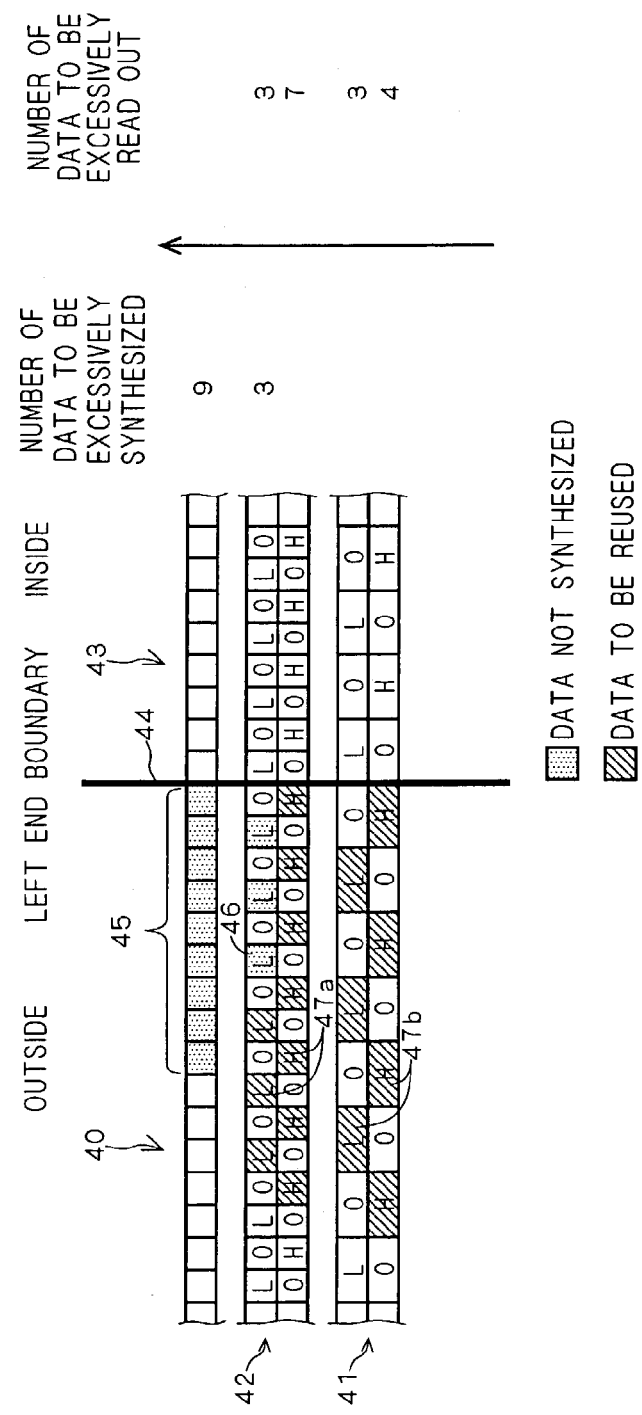
FIG. 62 shows excess data to be read out at a leading end position of the notice data column on the synthesis side when the 9×7 filter is used.

FIG. 61 shows data which is synthesized at the trailing position of the notice data column 40 on the synthesis side when a two-stage 9×7 filter is used, and FIG. 62 shows data 43 which is synthesized at the right neighboring strip region of FIG. 61 where the synthesis is performed after data synthesis in FIG. 61. That is, a right end boundary 44 of the strip region 40 shown in FIG. 61 is a left end boundary 44 of the strip region 43 shown in FIG. 62, and the inner side and the outer side of the right end boundary 44 of the strip region 40 corresponds to the outer side and the inner side of the left end boundary 44 of the strip region 43, respectively.

First in the 9×7 filter, synthesis is made in the Tap number as described in the principle 1 of the synthesis side, however, since the data outside of the right end boundary 44 is not read out when synthesizing the data 40 of FIG. 61, data which requires this outside data cannot be synthesized. The data 45 and 46 in the hatched part shown in FIG. 61 apply to this data, and three sets of low-pass data L in the first stage 42 and 9 sets of data 45 at the trailing end of the notice data column 40 cannot be synthesized. The data 45 and 46 that cannot be synthesized is synthesized when the data is synthesized at the right neighboring strip region 43. At this time, data 47a and 47b that is required as outside data of the left end boundary 44 is stored in synthesized state in the line memory when the strip region 40 is synthesized. The data 47a and 47b stored in the line memory for use again is the data of the diagonally hatched part, that is the total of 17 sets of data including three sets of low-pass data L and four sets of high-pass data H (47b) in the second stage 41, and three sets of low-pass data L and seven sets of high-pass data H (47a) in the first stage 42.

After the strip region 40 finishes synthesis while leaving the data 45 and 46 which cannot be synthesized, the strip region 43 shown in FIG. 62 is then synthesized. And at the time of synthesizing the left end data, the data that cannot be synthesized previously (dispersed dot portions 45 and 46) is synthesized using the 17 sets of data read out from the line memory (diagonally hatched portions 47a and 47b) and the data inside the left end boundary 44.

Figure 63:
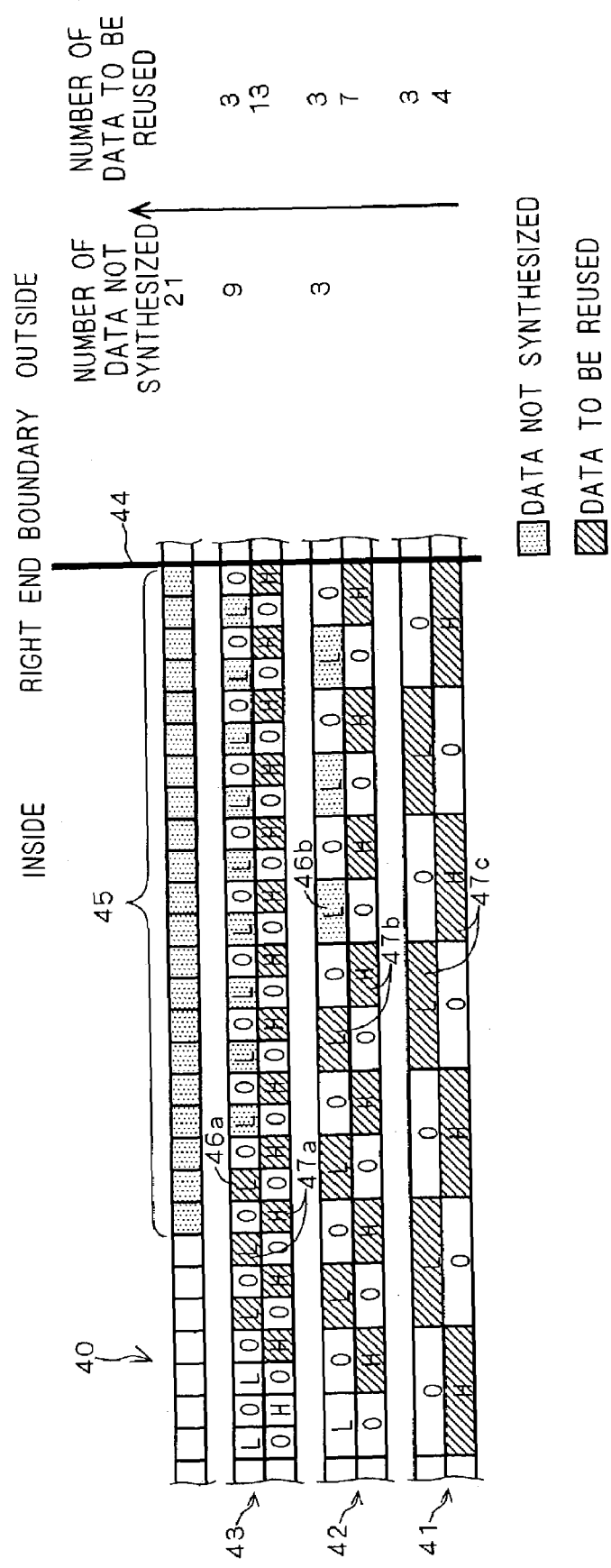
FIG. 63 shows excess data to be read out at the trailing end position of the notice data column on the synthesis side when the 9×7 filter is used.
Figure 64:
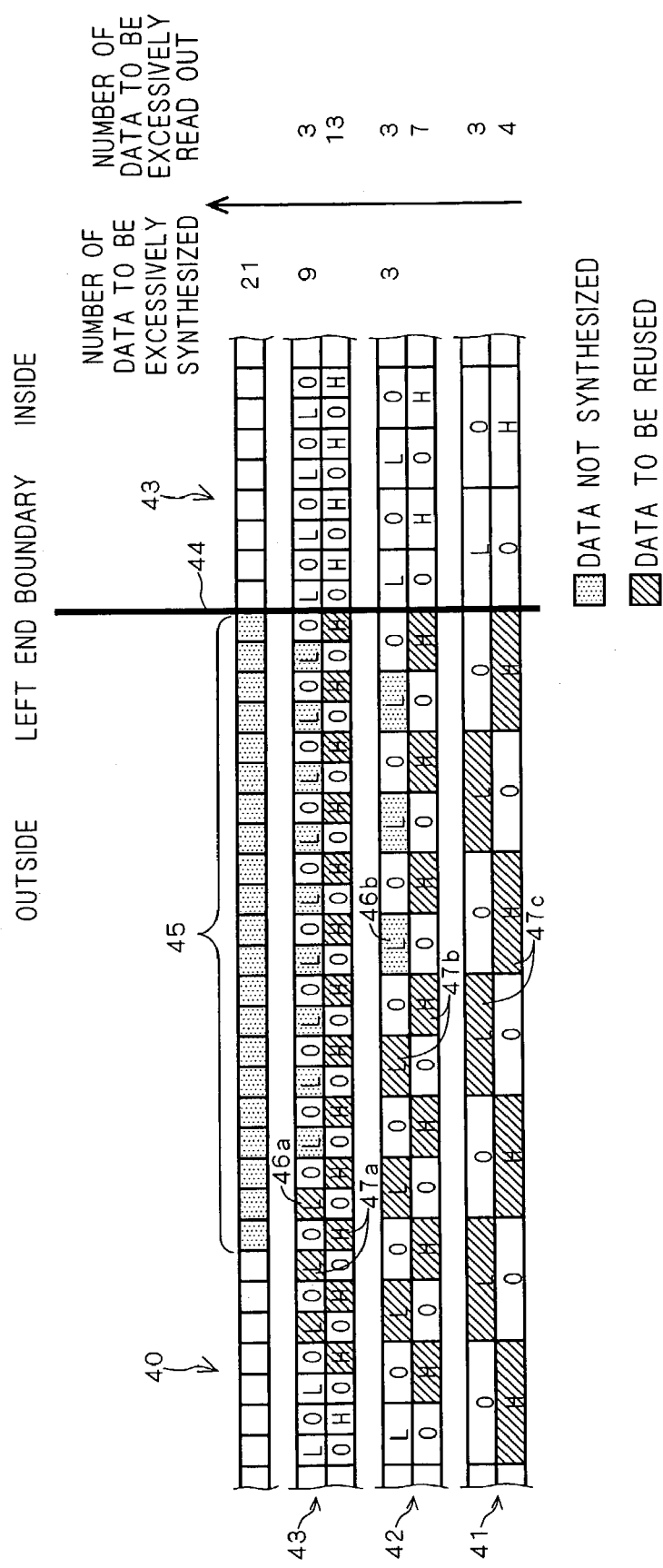
FIG. 64 shows excess data to be read out at the leading end position of the notice data column on the synthesis side when the 9×7 filter is used.

FIG. 63 shows data which is synthesized at the trailing position of the notice data column 40 on the synthesis side when a three-stage 9×7 filter is used, and FIG. 64 shows data 43 which is synthesized at the right neighboring strip region of FIG. 63 where the synthesis is performed after data synthesis in FIG. 63. As described above, since the data outside the right end boundary 44 is not read out, a part denoted by the dispersed dots in FIG. 63, that is three sets of low-pass data L (46b) in the second stage 42, nine sets of low-pass data L (46a) in the first stage 43, and 21 sets of data 45 at the trailing end of the notice data column 40 cannot be synthesized. These data 45, 46a and 46b which cannot be synthesized is then synthesized when left end data is synthesized at the right neighboring strip region 43 using the data 47a to 47c denoted by the diagonally hatched portion in FIG. 63 store din the line memory. At this time, the data stored in the line memory for use again is 33 sets in total: three sets of low-pass data L and four sets of high-pass data H (47c) in the third stage 41; three sets of low-pass data L and seven sets of high-pass data H (47b) in the second stage 42; and three sets of low-pass data L and 13 sets of high-pass data H (47a) in the first stage 43. Then in synthesizing the left end data of the strip region 43 neighboring on the right as shown in FIG. 64, the 33 sets of data read out from the line memory (diagonally hatched portions 47a to 47c) and the data 43 inside the left end boundary 44 are used to synthesize the data that cannot be synthesized previously (dispersed dot portions 45, 46a and 46b).

As described above, in the principle 2 of the synthesis side, unlike the principle 1 of the synthesis side wherein the process is executed while excessively reading out data on the left and right side of the strip region, data is not excessively read out on the right end, and hence the data which cannot be synthesized at the right end is synthesized when synthesizing left end data of the right neighboring region. Furthermore, since the excess data outside the left side boundary to be read out for synthesizing the data that cannot be synthesized in the left neighboring region is stored in the line memory in the condition of being synthesized in the synthesis of data at the left neighboring region. Accordingly, in order to synthesize the data that cannot be synthesized in the left neighboring region, and the left end data, it is not necessary to synthesize the left neighboring region, but only reading out data from the line memory is required.

The data number $Y_n$ which cannot be synthesized at the right end of a strip region can be represented by the following general expression (5). Herein, n in the expression (5) means that the number of decomposition levels n (n=1, 2, . . . ) in the Mallat-type band decomposition in the wavelet transform is n.

$$Y_{n-1} = 2Y_n + 3, \ Y_1 = 3$$

$$\therefore Y_n = 3 \cdot 2^n - 3 \tag{5}$$

Likewise, using n, the data number $RL_n$ of the low-pass data L to be stored in the line memory for used in synthesis of left end data of the right neighboring strip region so as to synthesize the data that cannot be synthesized at the right end of the strip region is represented by the following general expression (6).

$$RL_n = 3 \tag{6}$$

Likewise, using n, the data number $RH_n$ of the high-pass data H to be stored in the line for used in synthesis of left end data of the right neighboring strip region so as size the data that cannot be synthesized at the right end of the strip region is ted by the following general expression (7).

$$RH_n = Y_{n-1} + 4, \text{ (wherein } Y_0 = 0) \tag{7}$$

From these expressions (5) to (7), the data number at the right end that cannot be synthesized on the synthesis side of the 9×7 filter, as well as the data number to be temporarily stored in the line memory for synthesizing the same and read out at the time of synthesis of the right neighboring region depend on the number of decomposition levels (WT number) of wavelet transform and is shown in Table 7 below.

TABLE 7

| WT number | $Y_n$ | Sum total 1 | $RL_n$ | $RH_n$ | Sum total 2 | Required data number |
|---|---|---|---|---|---|---|
| 1 | 3 | 3 | 3 | 4 | 7 | 10 |
| 2 | 9 | 12 | 3 | 7 | 17 | 29 |
| 3 | 21 | 33 | 3 | 13 | 33 | 66 |
| 4 | 45 | 78 | 3 | 25 | 61 | 139 |
| 5 | 93 | 171 | 3 | 49 | 113 | 284 |
| 6 | 189 | 360 | 3 | 97 | 213 | 573 |
| 7 | 381 | 741 | 3 | 193 | 409 | 1150 |
| 8 | 765 | 1506 | 3 | 385 | 797 | 2303 |
| 9 | 1533 | 3039 | 3 | 769 | 1569 | 4608 |
| 10 | 3069 | 6108 | 3 | 1537 | 3109 | 9217 |

In Table 7, "sum total 1" and "sum total 2" each represents sum total of data number that cannot be synthesized and data number temporarily stored in the line memory and used again at the time of synthesis of the right neighboring region (sum of low-pass data L and high-pass data H). For example, in the case where the number of decomposition levels (WT number) is two, since it is necessary to synthesize 12 sets of data by reading out 17 sets of data stored in the line memory, the required data number is 17+12=29, and the line memory requires an extra capacity corresponding to this for processing the data of the strip region.

Figure 65:
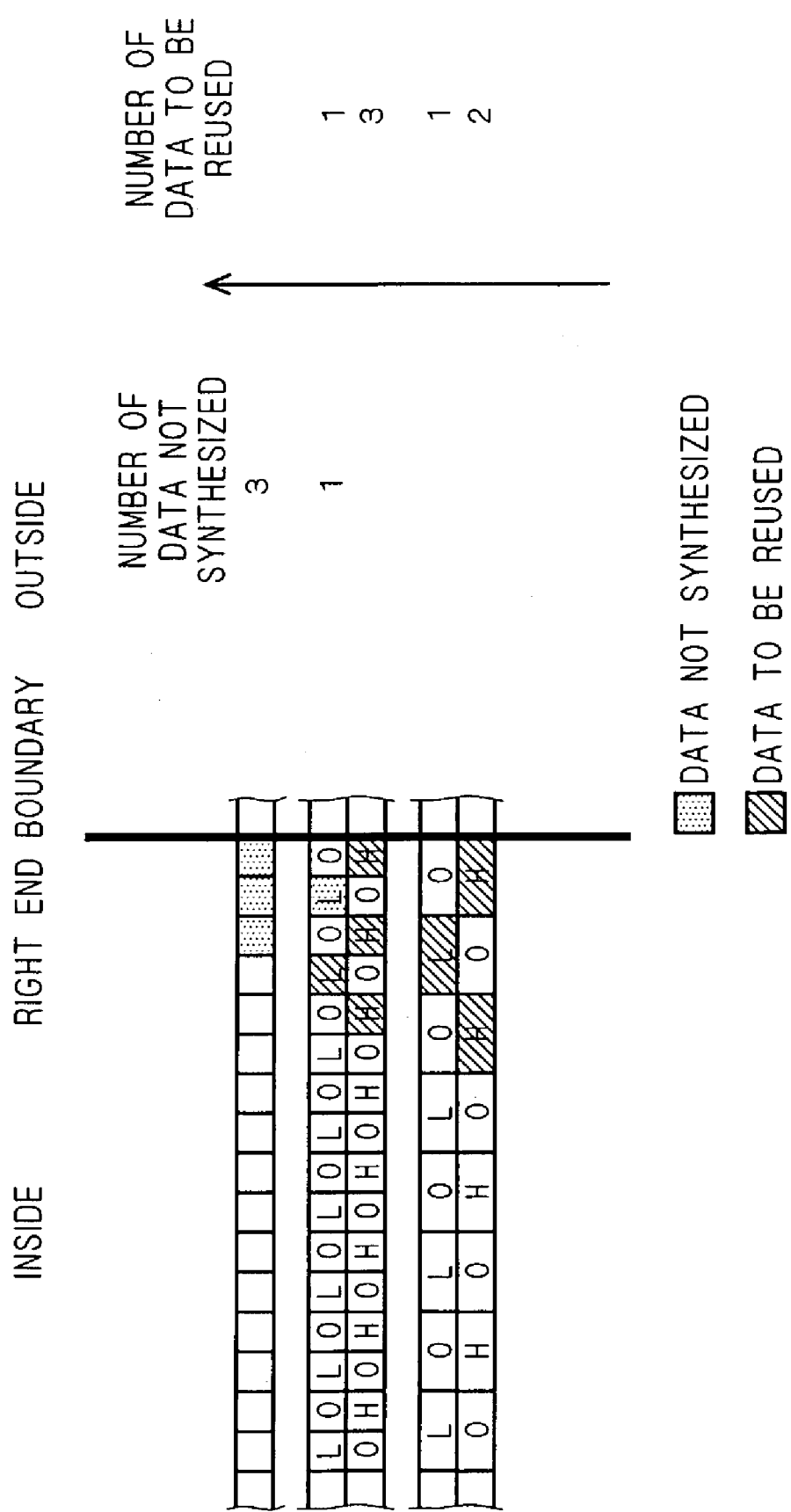
FIG. 65 shows excess data to be read out at the trailing end position of the notice data column on the synthesis side when a 5×3 filter is used.
Figure 66:
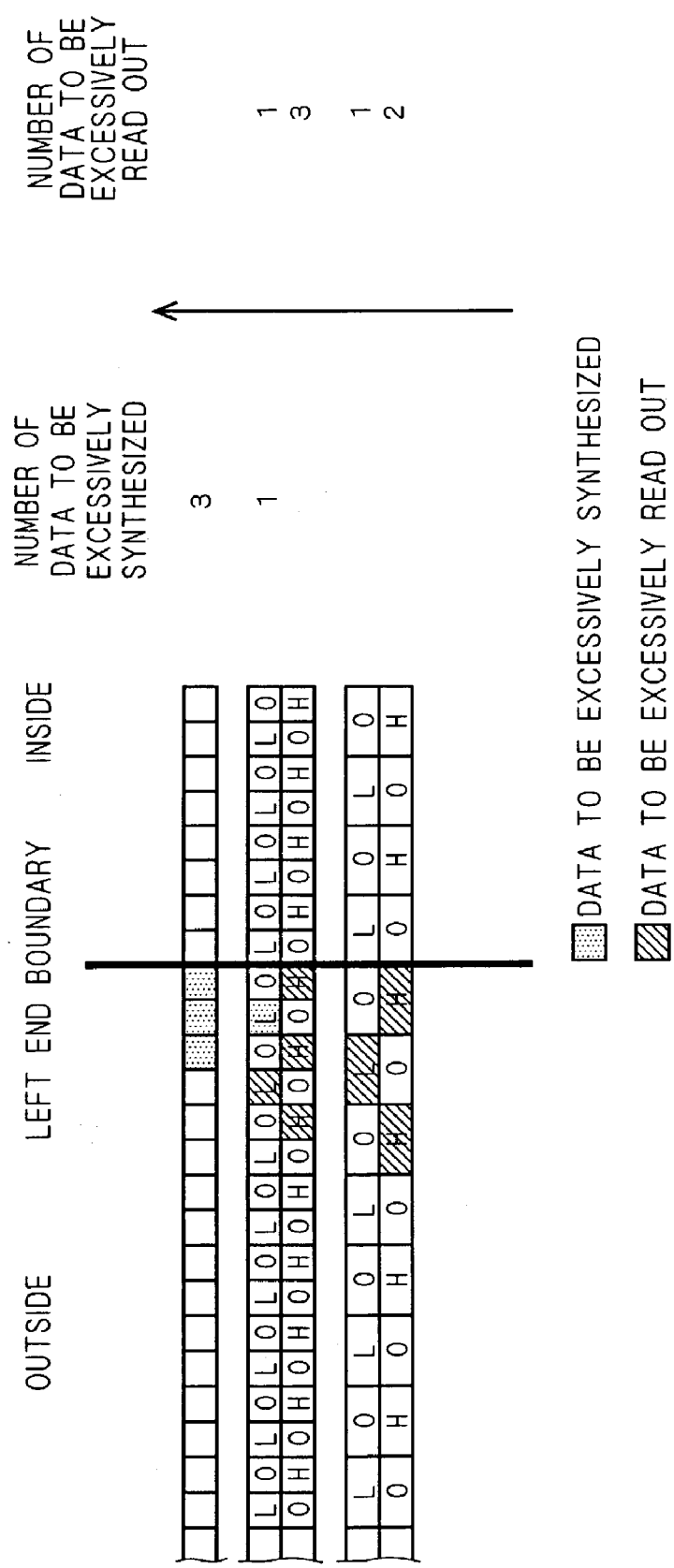
FIG. 66 shows excess data to be read out at the leading end position of the notice data column on the synthesis side when the 5×3 filter is used.
Figure 67:
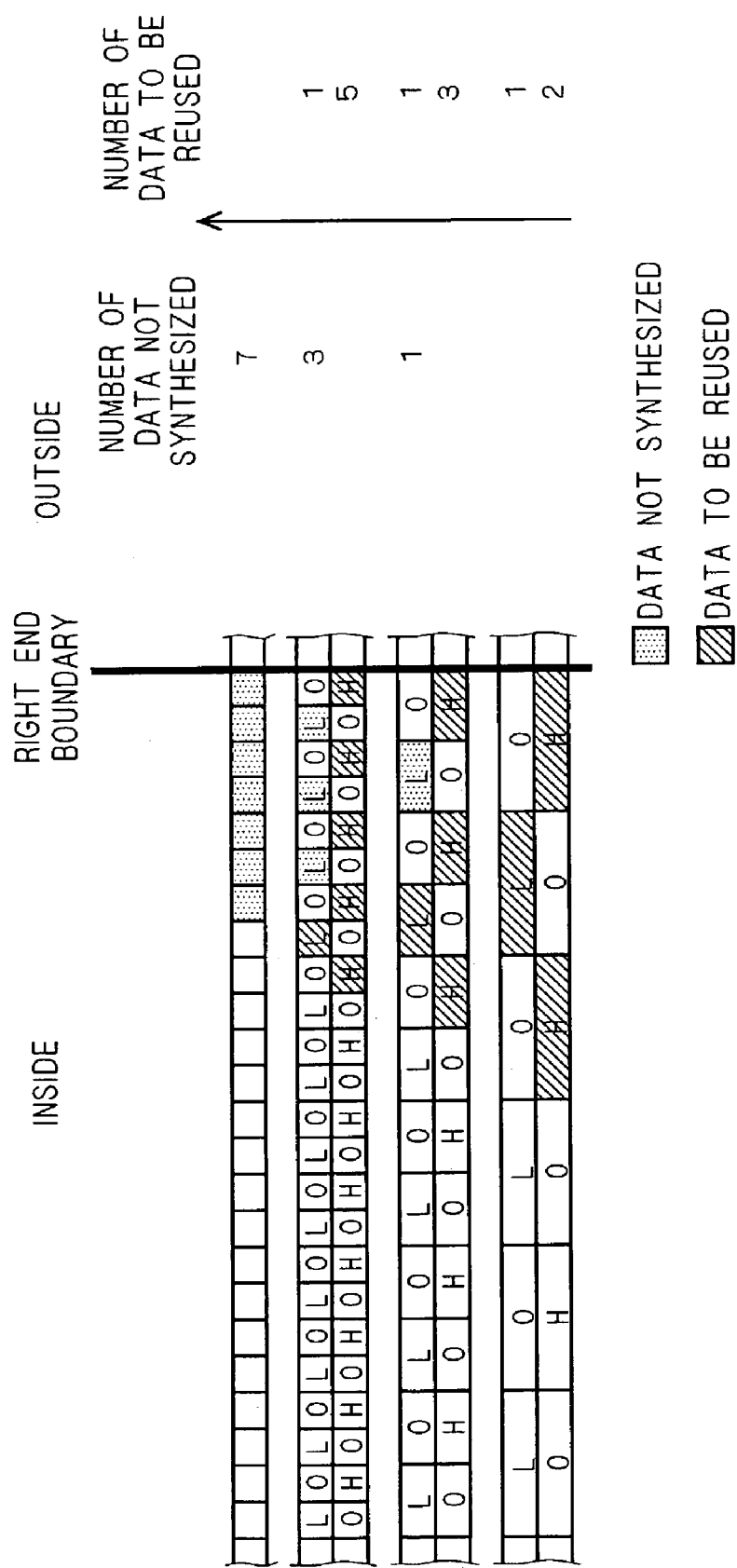
FIG. 67 shows excess data to be read out at the trailing end position of the notice data column on the synthesis side when the 5×3 filter is used.
Figure 68:
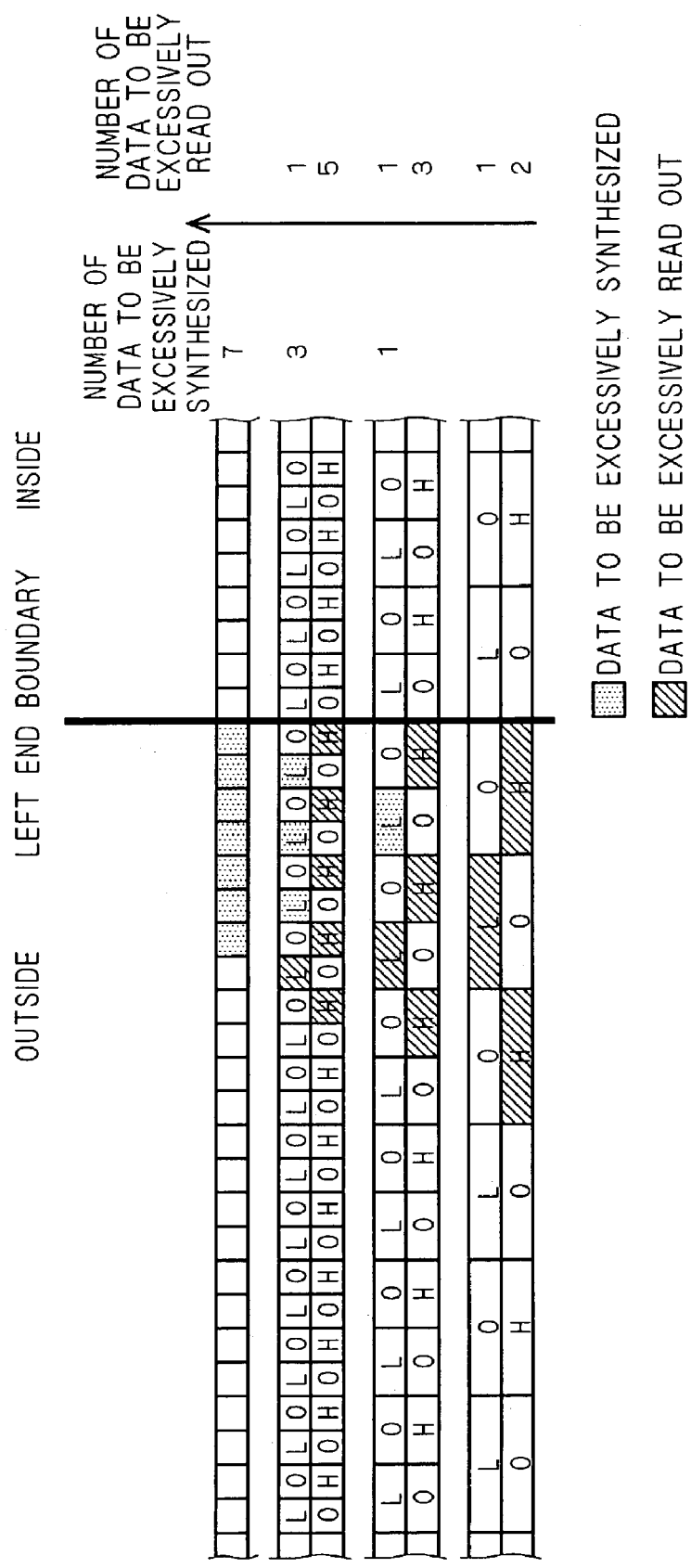
FIG. 68 shows excess data to be read out at the leading end position of the notice data column on the synthesis side when the 5×3 filter is used.

Likewise, in the case of the 5×3 filter, data that cannot be synthesized at the right end and the data to be used again at the left end when data is synthesized at the right neighboring region is denoted by the dispersed dot portion and the diagonally hatched portion in FIGS. 65 and 66 in the case of two-stage and in FIGS. 67 and 68 in the case of three-stage. In the case of two-stage, the number of data that cannot be synthesized (dispersed dot portion in FIG. 65 or 66) is four in total, while the number of data to be used again (diagonally hatched portion in FIG. 65 or 66) is seven in total. While in the case of three-stage, the number of data that cannot be synthesized (dispersed dot portion in FIG. 67 or 68) is 11 in total, while the number of data to be used again (diagonally hatched portion in FIG. 67 or 68) is 13 in total.

The data number $Y_n$ which cannot be synthesized at the right end of a strip region can be represented by the following general expression (8), provided the number of decomposition levels n (n=1, 2, . . . ) in the Mallat-type band decomposition in the wavelet transform is represented by n.

$$Y_{n-1} = 2Y_n + 1, \ Y_1 = 1$$

$$\therefore Y_n = 2^n - 1 \tag{8}$$

Likewise, using n, the data number $RL_n$ of the low-pass data L to be stored in the line memory for used in synthesis of left end data of the right neighboring strip region so as to synthesize the data that cannot be synthesized at the right end of the strip region is represented by the following general expression (9).

$$RL_n 1 \tag{9}$$

Likewise, using n, the data number $RH_n$ of the high-pass data H to be stored in the line memory for used in synthesis of left end data of the right neighboring strip region so as to synthesize the data that cannot be synthesized at the right end of the strip region is represented by the following general expression (10).

$$RH_n = Y_{n-1} + 2, \text{ (wherein } Y_0 = 0) \tag{10}$$

From these expressions (8) to (10), the data number at the right end that cannot be synthesized on the synthesis side of the 5×3 filter, as well as the data number to be temporarily stored in the line memory for synthesizing the same and read out at the time of synthesis of the right neighboring region depend on the number of decomposition levels (WT number) of wavelet transform and is listed in Table 8 below.

TABLE 8

| WT number | $Y_n$ | Sum total 1 | $RL_n$ | $RH_n$ | Sum total 2 | Required data number |
|---|---|---|---|---|---|---|
| 1 | 1 | 1 | 1 | 2 | 3 | 4 |
| 2 | 3 | 4 | 1 | 3 | 7 | 11 |
| 3 | 7 | 11 | 1 | 5 | 13 | 24 |
| 4 | 15 | 26 | 1 | 9 | 23 | 49 |
| 5 | 31 | 57 | 1 | 17 | 41 | 98 |
| 6 | 63 | 120 | 1 | 33 | 75 | 195 |
| 7 | 127 | 247 | 1 | 65 | 141 | 388 |
| 8 | 255 | 502 | 1 | 129 | 271 | 773 |
| 9 | 511 | 1013 | 1 | 257 | 529 | 1542 |
| 10 | 1023 | 2036 | 1 | 513 | 1043 | 3079 |

In Table 8, as is the case of Table 7, "sum total 1" and "sum total 2" each represents sum total of data number that cannot be synthesized and data number temporarily stored in the line memory and used again at the time of synthesis of the right neighboring region (sum of low-pass data L and high-pass data H). For example, in the case where the number of decomposition levels (WT number) is two, since it is necessary to synthesize four sets of data by reading out seven sets of data stored in the line memory, the required data number is 7+4=11, and the line memory requires an extra capacity corresponding to this for processing the data of the strip region.

In conclusion, it can be recognized that in either of the 9×7 filter and the 5×3 filter, as the number of decomposition levels of wavelet transform increases, the data number required for synthesis, that is the line memory increases exponentially. Therefore, as is the similar to the principle 1 of the synthesis side described above, some thought should be put into the way of reading out compression data so as to reduce the line memory as small as possible. Some embodiments will be described below.

Eighth Embodiment

Figure 69:
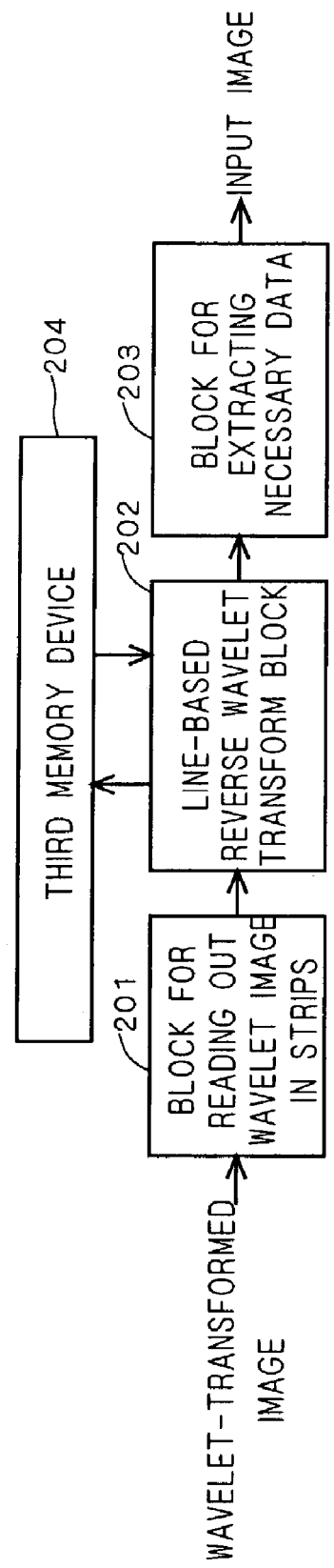
FIG. 69 is a block diagram showing a wavelet processing apparatus according to the first embodiment of the present invention.

In an eighth embodiment of the present invention, a reverse wavelet processing apparatus shown in FIG. 69 is used. This reverse wavelet processing apparatus includes: a readout block 201 (readout block) for reading out compression image data in strips that has been subjected to the wavelet transform process on the aforementioned decomposition side, as well as reading data that has been previously stored at the time of synthesis of the left neighboring data region so as to use again; a block (line-based reverse wavelet transform block) 202 for performing a line-based reverse wavelet transform on the data that has been read out at the readout block 201; a block (data extraction block) 203 for extracting necessary data from the line-based reverse wavelet transform block 202, as well as storing data to be used again when the next right neighboring data region is synthesized in the line memory; and a third memory device 204 corresponding to the line memory for temporarily storing data when a wavelet transform is executed at the line-based reverse wavelet transform block 202.

Figure 70:
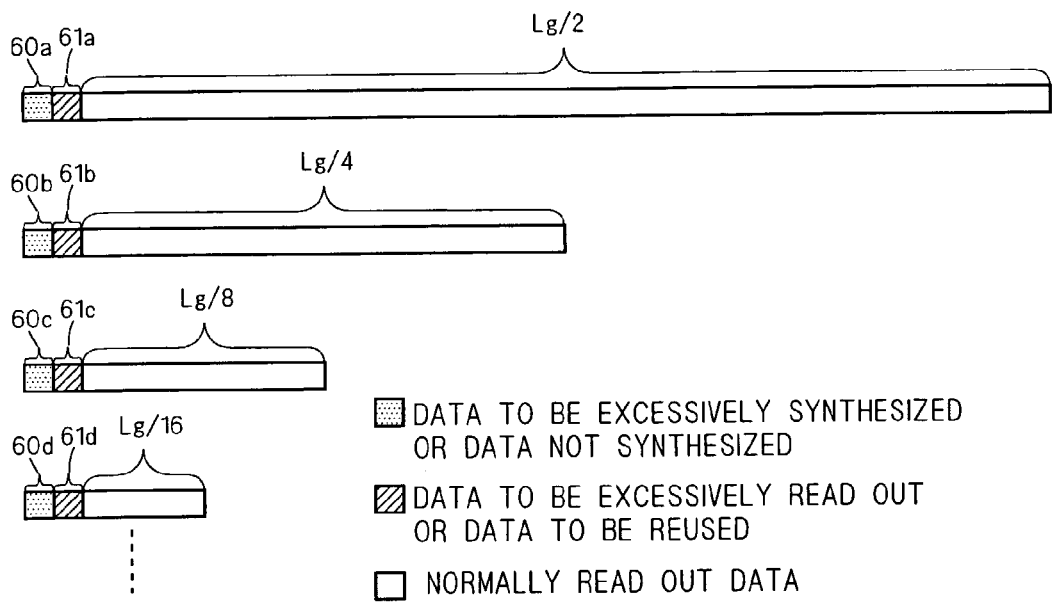
FIG. 70 shows excess data required for low-pass data in the wavelet processing method according to the first embodiment of the present invention.
Figure 71:
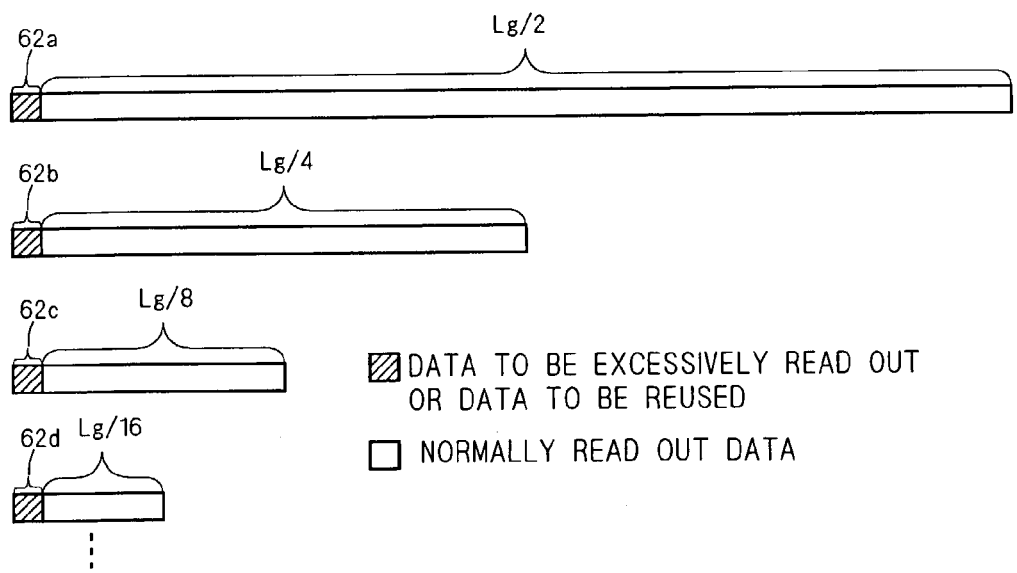
FIG. 71 shows excess data required for high-pass data in the wavelet processing method according to the first embodiment of the present invention.
Figure 75:
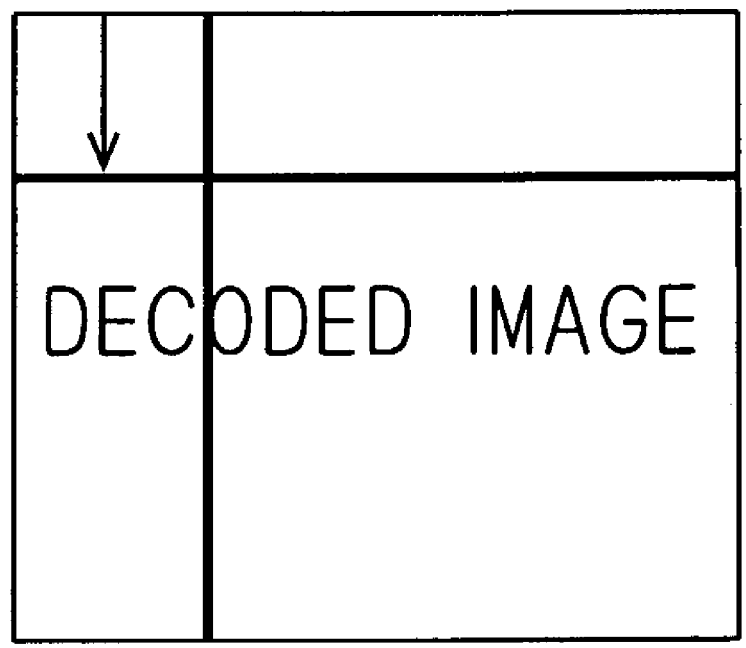
FIG. 75 shows a decoded image which is band-synthesized for each block region.

In the same manner as the above-described fifth embodiment, data is read out in strip shape. For performing a line-based wavelet, in addition to the data to be usually read out as shown in FIG. 70 (low-pass data) and FIG. 71 (high-pass data), a line memory is required for the data 60a to 60d excessively synthesized outside the left side boundary, and for the data 61a to 61d (low-pass side) and 62a to 62d (high-pass side) that is stored at the time of synthesis of the left neighboring region and to be excessively read out for use again when the data outside the strip region and the left end data within the strip region is synthesized.

The excessively required line memory depends on the Tap number of the filter and the wavelet number, and corresponds to the sum of $Y_n$, $RL_n$ and $RH_n$ shown in Tables 7 and 8. Herein, Lg represents size of one side along the horizontal direction when the data is decomposed into strips in the horizontal direction as shown in FIG. 10.

In the 9×7 filter, as can be seen from Table 7, the data number to be excessively synthesized is (60a, 60b, 60c, 60d . . . )=(3, 9, 21, 45 . . . ), the data number stored in the memory for use again, that is, the data number to be excessively read out is (61a, 61b, 61c, 61d . . . )=(3, 3, 3, 3 . . . ) on the low-pass side and (62a, 62b, 62c, 62d . . . )=(4, 7, 13, 25 . . . ) on the high-pass side. Likewise, In the 5×3 filter, as can be seen from Table 8, the data number to be excessively synthesized is (60a, 60b, 60c, 60d . . . )=(1, 3, 7, 15 . . . ), the data number stored in the memory for use again, that is, the data number to be excessively read out is (61a, 61b, 61c, 61d . . . )=(1, 1, 1, 1 . . . ) on the low-pass side and (62a, 62b, 62c, 62d . . . )=(2, 3, 5, 9 . . . ) on the high-pass side.

As described above, though a larger capacity of line memory is required compared to that of the fifth embodiment, by processing as described above, in contrast to the fifth embodiment, it is not necessary to read out data excessively outside the right boundary in processing each region. In addition, by using the line memory, it is not necessary to synthesize the data outside the left boundary again. Consequently, it is possible to synthesize an image by a process which is easier than that of the fifth embodiment.

Ninth Embodiment

In the case where the synthesis is executed according to the eighth embodiment, as the number of decomposition levels of the reverse wavelet transform increases, the number of line memory increases exponentially as shown in Tables 7 and 8. In view of this, in the present embodiment, an apparatus having the same structure as the FIG. 37 is used. The line-based reverse wavelet transform block 202, however, operates according to the principle 2 of the synthesis side in contrast to the fifth embodiment. In this apparatus, the reverse wavelet processing apparatus is provided with a fourth memory device 204b (large capacity memory device) in addition to the third memory device 204a, and using this, a circuit for performing a reverse wavelet transform for e.g., three-decomposition levels can be recursively used.

To be more specific, in the line-based reverse wavelet transform block 202, the reverse wavelet transform is repeated for three times using the third memory device 204a and the results are stored in the fourth memory device 204b at the 203 for extracting necessary data. Then at the time of executing the next reverse wavelet transform, in the block 201 for reading out a wavelet image in strips, the results of the reverse wavelet transforms of three times that are previously stored are read out from the fourth memory device 204b for use in executing the next three more reverse wavelet transforms.

In this manner, by using the line memory that can execute the reverse wavelet transform of a small number of decomposition levels (third memory device 204a) and the large capacity memory device (fourth memory device 204b), it is possible to realize the multi-level reverse wavelet transform with a small line memory. The number of decomposition levels of three is merely on example.

According to this, by putting some thought into the processing procedure, a reverse wavelet transform for deeper decomposition levels can be executed without causing any problems only by using the line memory of small memory capacity.

Tenth Embodiment

FIGS. 72 to 75 show the processing procedure when the data is handled in blocks to be subjected to the reverse wavelet transform using the reverse wavelet processing apparatus described in the ninth embodiment.

A reference numeral 71 in FIGS. 72 to 75 means data that is stored in the line memory for use at the time of synthesizing data in the neighboring region. As shown in FIG. 21, in the case where Precinct39 is decoded in the raster scanning order, the reverse transform in strips cannot be executed until the EBCOT decoding for one screen has completed. However, by decomposing in blocks as shown FIGS. 72 to 75 to thereby allow generation of data 71 which is stored for use again and read out at the time of synthesis of the neighboring region in the vertical direction as well, the reverse wavelet transform can be started when the EBCOT decoding for the portion corresponding to the precinct39 is finished.

As an arrangement for realizing such a process, a reverse wavelet processing apparatus shown in FIG. 51 which is equivalent to the sixth embodiment is used. It is noted that in contrast to the sixth embodiment, the line-based reverse wavelet transform block 202 operates in accordance with the principle 2 of the synthesis side. At this time, by reading left as top and right as bottom in the process executed in the strip region, the process can be expanded to the processing data in block form.

In this method, since the process is proceeded block region by block region from the block region at any position where the decoding is finished unless encoding for the all regions has finished, this is useful in the situation that decoded image is desired to be displayed as soon as possible when the data transfer speed is low via a network or the like.

Eleventh Embodiment

In an eleventh embodiment, a process which is similar to the seventh embodiment according to the principle 1 of the synthesis side is performed in accordance with the principle 2 of the synthesis side. At this time, only the process of line-based reverse wavelet transform is based on the principle 2 of the synthesis side, but other all processes are similar to those of the seventh embodiment. Also with regard to the processing apparatus that realizes such a process, it has the same configuration as that shown in FIG. 56 in the seventh embodiment and differs only in that the line-based reverse wavelet transform block 202 operates in accordance with the principle 2 of the synthesis side.

Also the resulting effect is as same as that of the seventh embodiment, and by putting some thought into the way of reading and writing of images, the effect identical to that obtained in processing the Precinct in blocks can be obtained by processing the strip regions.

Though the first to the fourth embodiments are described with regard to the processes of the decomposition side (wavelet transform), and the fifth to the eleventh embodiments are described with regard to the processes of the synthesis side (reverse wavelet transform) as separate embodiments, the decomposition side and the synthesis side may be incorporated into the same wavelet processing apparatus without causing any problems.

As for the first embodiment, the second embodiment, the third embodiment, the fourth embodiment, the fifth embodiment and the ninth embodiment, a line memory which is suitable for three-decomposition levels (WT number) is used, the decomposition number available in the line memory is not limited to three.

While the invention has been shown and described in detail, the foregoing description is in all aspects illustrative and not restrictive. It is therefore understood that numerous modifications and variations can be devised without departing from the scope of the invention.

What is claimed is:

1. A wavelet processing apparatus for executing a line-based wavelet process while decomposing an object region into a plurality of block regions in a matrix in vertical and horizontal directions, said wavelet processing apparatus comprising:
   a readout block for decomposing the object region into strip regions only in the horizontal direction such that each of said strip regions corresponds to each of said plurality of block regions, and reading out data of each of said strip regions while adding thereto a predetermined data number of excess data outside each of said strip regions in the horizontal direction as well as storing each piece of data in the horizontal direction as read out into a corresponding line memory;
   a line-based wavelet transform block for performing a line-based wavelet transform on the data read out at the readout block and stored in said line memory while decomposing the band of the data into a plurality of decomposition levels; and
   a data extraction block for extracting the data that has been subjected to the line-based wavelet transform at said line-based wavelet transform block in a predetermined format, wherein
   operations by said readout block, said line-based wavelet transform block and said data extraction block are executed sequentially at a stroke from the upper end to the lower end of each of said strip regions.

2. The wavelet processing apparatus according to claim 1, further comprising:
   a data readout order conversion block for outputting an image resulting from mirror conversion of an image followed by turning left by 90 degrees, to said readout block.

3. The wavelet processing apparatus according to claim 1, wherein
   said line-based wavelet transform block executes a line-based wavelet transform while repeatedly and recursively using a line memory limited to a predetermined number of decomposition levels.

4. The wavelet processing apparatus according to claim 3, wherein
   said line-based wavelet transform block stores intermediate data limited to the predetermined number of decomposition levels and recursively used into a large capacity memory device, thereby executing a line-based wavelet transform.

5. A wavelet processing apparatus for executing a line-based reverse wavelet transform process while handling image data having undergone wavelet transform in block shape, said wavelet processing apparatus comprising:
   a readout block for decomposing said image data into strip regions only in the horizontal direction and reading out data of each of said strip regions while adding thereto a predetermined data number of excess data outside each of said strip regions in the horizontal direction as well as storing each piece in the horizontal direction as read out into a corresponding line memory;
   a line-based reverse wavelet transform block for performing a line-based reverse wavelet transform on the data read out at the readout block and stored in said line memory ; and
   a data extraction block for extracting the data that has been subjected to the line-based reverse wavelet transform at said line-based wavelet transform block in a predetermined format to reproduce an image, wherein
   operations by said readout block, said line-based reverse wavelet transform block and said data extraction block are executed sequentially at a stroke from the upper end to the lower end of each of said strip regions.

6. The wavelet processing apparatus according to claim 5, further comprising:
   a data writing order conversion block for outputting an image resulting from mirror conversion of an image that has been outputted from said data extraction block followed by turning left by 90 degrees.

7. The wavelet processing apparatus according to claim 5, wherein
   said line-based reverse wavelet transform block executes a line-based reverse wavelet transform while repeatedly and recursively using a line memory which limits to a predetermined number of decomposition levels.

8. The wavelet processing apparatus according to claim 7, wherein
said line-based reverse wavelet transform block stores intermediate data limited to the predetermined number of decomposition levels and recursively used into a large capacity memory device, thereby executing a line-based reverse wavelet transform.

9. A wavelet processing apparatus for executing a line-based reverse wavelet transform process while handling image data having undergone wavelet transform in block shape, said wavelet processing apparatus comprising:
a readout block for decomposing said image data into strip regions only in the horizontal direction and reading out data of each of said strip regions while adding thereto a predetermined data number of excess data outside each of said strip regions in the horizontal direction as well as storing each piece of data in the horizontal direction as read out into a corresponding line memory;
a line-based reverse wavelet transform block for performing a line-based reverse wavelet transform on the data read out at said readout block and stored in said line memory; and
a data extraction block for extracting the data that has been subjected to the line-based reverse wavelet transform at said line-based wavelet transform block in a predetermined format to reproduce an image, and storing a predetermined data number of data on one end of each of said strip regions into a memory, wherein
operations by said readout block, said line-based reverse wavelet transform block and said data extraction block are executed sequentially at a stroke from the upper end to the lower end of each of said strip regions, and
said readout block is capable of reading out a predetermined data number of excess data outside each of said strip regions on the other end from said memory.

10. The wavelet processing apparatus according to claim 9, further comprising:
a data writing order conversion block for outputting an image resulting from mirror conversion of an image that has been outputted from said data extraction block followed by turning left by 90 degrees.

11. The wavelet processing apparatus according to claim 9, wherein
said line-based reverse wavelet transform block executes a line-based reverse wavelet transform while repeatedly and recursively using a line memory limited to a predetermined number of decomposition levels.

12. The wavelet processing apparatus according to claim 11, wherein
said line-based reverse wavelet transform block stores intermediate data limited to the predetermined number of decomposition levels and recursively used into a large capacity memory device, thereby executing a line-based reverse wavelet transform.

13. A wavelet processing method of executing a line-based wavelet process while decomposing an object region into a plurality of block regions in a matrix in vertical and horizontal directions, said wavelet processing method comprising the steps of:
(a) decomposing the object region into strip regions only in the horizontal direction such that each of said strip regions corresponds to each of said plurality of block regions, and reading out data of each of said strip regions while adding thereto a predetermined data number of excess data outside each of said strip regions in the horizontal direction as well as storing each piece of data in the horizontal direction as read out into a corresponding line memory;
(b) performing a line-based wavelet transform on the data read out in said step (a) and stored in said line memory while decomposing the band of the data into a plurality of decomposition levels; and
(c) extracting the data that has been subjected to the line-based wavelet transform in said step (b) in a predetermined format, wherein
said steps (a) to (c) are executed sequentially at a stroke from the upper end to the lower end of each of said strip regions.

14. The wavelet processing method according to claim 13, further comprising the step of:
(d) generating an image resulting from mirror conversion of an image followed by turning left by 90 degrees, prior to said step (a).

15. The wavelet processing method according to claim 13, wherein
in said step (b), a line-based wavelet transform is executed while repeatedly and recursively using a line memory limited to a predetermined number of decomposition levels.

16. The wavelet processing method according to claim 15, wherein
in said step (c), intermediate data limited to the predetermined number of decomposition levels and recursively used is stored into a large capacity memory device, to thereby execute a line-based wavelet transform.

17. A wavelet processing method of executing a line-based reverse wavelet transform process while handling image data having undergone wavelet transform in block shape, said wavelet processing method comprising the steps of:
(a) decomposing said image data into strip regions only in the horizontal direction and reading out data of each of said strip regions while adding thereto a predetermined data number of excess data outside each of said strip regions in the horizontal direction as well as storing each piece of data in the horizontal direction as read out into a corresponding line memory;
step (b) performing a line-based reverse wavelet transform on the data read out in said step (a); and
(c) extracting the data that has been subjected to the line-based reverse wavelet transform at said second step in a predetermined format to reproduce an image, wherein
said steps (a) to (e) are executed sequentially at a stroke from the upper end to the lower end of each of said strip regions.

18. The wavelet processing method according to claim 17, further comprising the step of:
(d) outputting an image resulting from mirror conversion of an image that has been outputted from said data extraction block followed by turning left by 90 degrees, after said step (c).

19. The wavelet processing method according to claim 17, wherein
in said step (b), a line-based reverse wavelet transform is executed while repeatedly and recursively using a line memory limited to a predetermined number of decomposition levels.

20. The wavelet processing method according to claim 19, wherein
in said step (c), intermediate data limited to the predetermined number of decomposition levels and recursively used is stored into a large capacity memory device, to thereby execute a line-based reverse wavelet transform.

21. A wavelet processing method of executing a line-based reverse wavelet transform process while handling image data having undergone wavelet transform in block shape, said wavelet processing method comprising the steps of:

(a) decomposing said image data into strip regions only in the horizontal direction and reading out data of each of said strip regions while adding thereto a predetermined data number of excess data outside each of said strip regions in the horizontal direction as well as storing each piece of data in the horizontal direction as read out into a corresponding line memory;

(b) performing a line-based reverse wavelet transform on the data read out and stored in said line memory in said step (a); and (c) extracting the data that has been subjected to the line-based reverse wavelet transform in said step (b) in a predetermined format to reproduce an image, and storing a predetermined data number of data on one end of each of said strip regions into a memory, wherein said steps (a) to (c) are executed sequentially at a stroke from the upper end to the lower end of each of said strip regions, and said step (a) is capable of reading out a predetermined data number of excess data outside each of said strip regions on the other end from said memory.

22. The wavelet processing method according to claim 21, further comprising the step of:

(d) outputting an image resulting from mirror conversion of an image that has been outputted from said data extraction block followed by turning left by 90 degrees, after said step (c).

23. The wavelet processing method according to claim 21, wherein in said step (b), a line-based reverse wavelet transform is executed while repeatedly and recursively using a line memory limited to a predetermined number of decomposition levels.

24. The wavelet processing method according to claim 23, wherein in said step (c), intermediate data limited to the predetermined number of decomposition levels and recursively used is stored into a large capacity memory device, to thereby execute a line-based reverse wavelet transform.

25. A wavelet processing apparatus for executing a line-based wavelet process while decomposing an object region into a plurality of block regions in a matrix in vertical and horizontal directions, said wavelet processing apparatus comprising:

a readout block for reading out data of each of said plurality of block regions while adding thereto a predetermined data number of excess data outside each of said plurality of block regions in the horizontal direction as well as a predetermined data number of excess line data outside each of said plurality of block regions in the vertical direction, and storing each piece of data in the horizontal direction as read out into a corresponding line memory;

a line-base wavelet transform block for performing a line-based wavelet transform on the data read out at the readout block and store in said line memory while decomposing the band of the data into a plurality of decomposition levels; and a data extraction block for extracting the data that has been subjected to the line-based wavelet transform at said line-based wavelet transform block in a predetermined format, wherein said line memory is capable of storing excess data required in line-based wavelet transform when band decomposition is performed into a predetermined number of decomposition levels, and said readout block is capable of reading out data outputted from said data extraction block after said band decomposition.

26. The wavelet processing apparatus according to claim 25, wherein said line-based wavelet transform block stores intermediate data limited to the predetermined number of decomposition levels and recursively used into a large capacity memory device, thereby executing a line-based wavelet transform.

27. A wavelet processing apparatus for executing a line-based reverse wavelet transform process while handling image data having undergone wavelet transform in block shape, said wavelet process apparatus comprising:

a readout block for reading out data of each of said plurality of block regions while adding thereto a predetermined data number of excess data outside each of said plurality of block regions in the horizontal direction as well as a predetermined data number of excess line data outside each of said plurality of block regions in the vertical direction, and storing each piece of data in the horizontal direction as read out into a corresponding line memory;

a line-based reverse wavelet transform block for performing a line-based reverse wavelet transform on the data read out at the readout block and stored in said line memory; and a data extraction block for extracting the data that has been subjected to the line-based reverse wavelet transform at said line-based reverse wavelet transform block in a predetermined format to reproduce an image, wherein said line memory is capable of storing excess data required in line-based reverse wavelet transform when band decomposition is performed a predetermined number of decomposition levels, and said readout block is capable of reading out data outputted from said data extraction block after said band decomposition.

28. The wavelet processing apparatus according to claim 27, wherein said line-based reverse wavelet transform block stores intermediate data limited to the predetermined number decomposition levels and recursively used into a large capacity memory device, thereby executing a line-based reverse wavelet transform.

29. A wavelet processing apparatus for executing a line-based reverse wavelet transform process while handling image data having undergone wavelet transform in block shape, said wavelet processing apparatus comprising:

a readout block for reading out data of each of said plurality of block regions while adding thereto a predetermined data number of excess data outside each of said plurality of block regions in the horizontal direction as well as a predetermined data number of excess line data outside each of said plurality of block regions in the vertical direction, and storing each piece of data in the horizontal direction as read out into a corresponding line memory;

a line-based reverse wavelet transform block for performing a line-based reverse wavelet transform on the data read out at the readout block and stored in said line memory; and a data extraction block for extracting the data that has been subjected to the line-based reverse wavelet transform at said line-based reverse wavelet transform block in a predetermined format to reproduce an image, and storing a predetermined data number of data on one end of each of said block regions into a memory, wherein said line memory is capable of storing excess data required in line-based reverse wavelet transform when band decomposition is performed into a predetermined number of decomposition levels, and said readout block is capable of reading out data outputted from said data extraction block after said band decomposition as well as reading out a predetermined data number of excess data outside each of said block regions on the other end from said memory.

30. The wavelet processing apparatus according to claim 29, wherein said line-based reverse wavelet transform block stores intermediate data limited to the predetermined number of decomposition levels and recursively used into a large capacity memory device, thereby executing a line-based reverse wavelet transform.

31. A wavelet processing method of executing a line-based wavelet process while decomposing an object region into a plurality of block regions in a matrix in vertical and horizontal directions, said wavelet processing method comprising the steps of:

(a) reading out data of each of said plurality of block regions while adding thereto a predetermined data number of excess data outside each of said plurality of block regions in the horizontal direction as well as a predetermined data number of excess line data outside each of said plurality of block regions in the vertical direction, and storing each piece of data in the horizontal direction as read out into a corresponding line memory;

(b) performing a line-based wavelet transform on the data read out and stored in said line memory in said step (a) while decomposing the band of the data into a plurality of decomposition levels; and (c) extracting the data that has been subjected to the line-based wavelet transform in said step (b) in a predetermined format, wherein said line memory is capable of storing excess data required in line-based wavelet transform when band decomposition is performed into a predetermined number of decomposition levels, and said step (a) is capable of reading out data generated in said step (c) after said band decomposition.

32. The wavelet processing method according to claim 31, wherein in said step (c), intermediate data limited to the predetermined number of decomposition levels and recursively used is stored into a large capacity memory device, thereby executing a line-based wavelet transform.

33. A wavelet processing method of executing a line-based reverse wavelet transform process while handling image data having undergone wavelet transform in block shape, said wavelet processing method comprising the steps of:

(a) reading out data of each of said plurality of block regions while adding thereto a predetermined data number of excess data outside each of said plurality of block regions in the horizontal direction as well as a predetermined data number of excess line data outside each of said plurality of block regions in the vertical direction, and storing each piece of data in the horizontal direction as read out into a corresponding line memory;

(b) performing a line-based reverse wavelet transform on the data read out and stored in said line memory in said step (a); and (c) extracting the data that has been subjected to the line-based reverse wavelet reverse transform in said step (b) in a predetermined format to reproduce an image, wherein said line memory is capable of storing excess data required in line-based reverse wavelet transform when band decomposition is performed into a predetermined number of decomposition levels, and said step (a) is capable of reading out data generated in said step (c) after said band decomposition.

34. The wavelet processing method according to claim 33, wherein in said step (c), intermediate data limited to the predetermined number of decomposition levels and recursively used is stored into a large capacity memory device, thereby executing a line-based reverse wavelet transform.

35. A wavelet processing method of executing a line-based reverse wavelet transform process while handling image data having undergone wavelet transform in block shape, said wavelet processing method comprising the steps of:

(a) reading out data of each of said plurality of block regions while adding thereto a predetermined data number of excess data outside each of said plurality of block regions in the horizontal direction as well as a predetermined data number of excess line data outside each of said plurality of block regions in the vertical direction, and storing each piece of data in the horizontal direction as read out into a corresponding line memory;

(b) performing a line-based reverse wavelet transform on the data read out and stored said line memory in said step (a); and (c) extracting the data that has been subjected to the line-based reverse wavelet transform in said step (b) in a predetermined format to reproduce an image, and storing a predetermined data number of data on one end of each of said block regions into a memory, wherein said line memory is capable of storing excess data required in line-based reverse wavelet transform when band decomposition is performed into a predetermined number of decomposition levels, and said step (a) is capable of reading out data generated in said step (c) after said band decomposition as well as reading out a predetermined data n umber of excess data outside each of said block regions on the other end from said memory.

36. The wavelet processing method according to claim 35, wherein in said step (b), intermediate data limited to the predetermined number of decomposition levels and recursively used is stored into a large capacity memory device, thereby executing a line-based reverse wavelet transform.

* * * * *